US012288384B2

(12) United States Patent
Sultana et al.

(10) Patent No.: US 12,288,384 B2
(45) Date of Patent: Apr. 29, 2025

(54) SYSTEM AND METHOD FOR SELF-DISTILLED VISION TRANSFORMER FOR DOMAIN GENERALIZATION

(71) Applicant: Mohamed bin Zayed University of Artificial Intelligence, Abu Dhabi (AE)

(72) Inventors: Maryam Sultana, Abu Dhabi (AE); Muhammad Muzammal Naseer, Abu Dhabi (AE); Muhammad Haris Khan, Abu Dhabi (AE); Salman Khan, Abu Dhabi (AE); Fahad Shahbaz Khan, Abu Dhabi (AE)

(73) Assignee: Mohamed bin Zayed University of Artifical Intellegence, Abu Dhabi (AE)

( * ) Notice: Subject to any disclaimer, the term of this patent is extended or adjusted under 35 U.S.C. 154(b) by 381 days.

(21) Appl. No.: 18/084,152

(22) Filed: Dec. 19, 2022

(65) Prior Publication Data

US 2024/0203098 A1 Jun. 20, 2024

(51) Int. Cl.
*G06V 10/774* (2022.01)
*G06V 10/764* (2022.01)
(Continued)

(52) U.S. Cl.
CPC .......... *G06V 10/774* (2022.01); *G06V 10/764* (2022.01); *G06V 10/7715* (2022.01);
(Continued)

(58) Field of Classification Search
CPC .. G06V 10/774; G06V 10/7715; G06V 10/82; G06V 10/776; G06V 10/764; G06V 2201/03
See application file for complete search history.

(56) References Cited

U.S. PATENT DOCUMENTS 9,607,391 B2 * 3/2017 Price .................. G06T 7/11
11,348,227 B2 * 5/2022 Fan .................. G06V 10/25
(Continued)

FOREIGN PATENT DOCUMENTS

WO 2021/191908 A1 9/2021

OTHER PUBLICATIONS

Chen, et al. ; DearKD: Data-Efficient Early Knowledge Distillation for Vision Transformers ; Shanghai Tech University, JD Explore Academy, Meituan Inc., The University of Sydney, Shanghai Engineering Research Center of Intelligent Vision and Imaging, Shanghai Engineering Research Center of Energy Efficient and Custom AI IC; Apr. 28, 2022 ; 12 Pages.

*Primary Examiner* — Manav Seth
(74) *Attorney, Agent, or Firm* — Oblon, McClelland, Maier & Neustadt, L.L.P.

(57) ABSTRACT

An apparatus and method for a machine learning engine for domain generalization which trains a vision transformer neural network using a training dataset including at least two domains for diagnosis of a medical condition. Image patches and class tokens are processed through a sequence of feature extraction transformer blocks to obtain a predicted class token. In parallel, intermediate class tokens are extracted as outputs of each of the feature extraction transformer blocks, where each transformer block is a sub-model. One sub-model is randomly sampled from the sub-models to obtain a sampled intermediate class token. The intermediate class token is used to make a sub-model prediction. The vision transformer neural network is optimized based on a difference between the predicted class token and the sub-model prediction. Inferencing is performed for a target medical image in a target domain that is different from the at least two domains.

20 Claims, 29 Drawing Sheets

(51) Int. Cl.
*G06V 10/77* (2022.01)
*G06V 10/776* (2022.01)
*G06V 10/82* (2022.01)

(52) U.S. Cl.
CPC ............ *G06V 10/776* (2022.01); *G06V 10/82* (2022.01); *G06V 2201/03* (2022.01)

(56) References Cited

U.S. PATENT DOCUMENTS

| | | | |
|---|---|---|---|
| 11,449,717 B2 * | 9/2022 | Zhang | G06N 3/08 |
| 11,540,808 B2 * | 1/2023 | Nouri | G06T 7/70 |
| 11,551,807 B2 * | 1/2023 | Adiri | G06T 7/70 |
| 11,715,008 B2 * | 8/2023 | Indenbom | G06N 3/045 |
| | | | 704/9 |
| 2014/0270489 A1 * | 9/2014 | Lim | G06F 18/40 |
| | | | 382/159 |
| 2017/0360411 A1 * | 12/2017 | Rothberg | G06T 7/70 |
| 2020/0085382 A1 * | 3/2020 | Taerum | A61B 5/7264 |
| 2021/0192343 A1 * | 6/2021 | Hwang | G06T 7/168 |
| 2022/0237682 A1 | 7/2022 | Zhao et al. | |
| 2022/0277218 A1 | 9/2022 | Fan et al. | |
| 2022/0328189 A1 * | 10/2022 | Zhou | G06V 10/82 |
| 2022/0351387 A1 * | 11/2022 | Petrov | G06T 7/0012 |
| 2023/0317227 A1 * | 10/2023 | Sinha | G06V 10/44 |
| | | | 705/2 |
| 2023/0386646 A1 * | 11/2023 | Tanwani | G06V 10/806 |
| 2023/0419102 A1 * | 12/2023 | Truong | G06N 3/0464 |
| 2024/0232526 A1 * | 7/2024 | Archambeau | G06F 16/2246 |
| 2025/0068419 A1 * | 2/2025 | Fu | G06N 3/0455 |

\* cited by examiner

SYSTEM AND METHOD FOR SELF-DISTILLED VISION TRANSFORMER FOR DOMAIN GENERALIZATION

STATEMENT REGARDING PRIOR DISCLOSURE BY THE INVENTORS

Aspects of this technology are described in Sultana, Maryam, Muzammal Naseer, Muhammad Haris Khan, Salman Khan, and Fahad Shahbaz Khan. "Self-Distilled Vision Transformer for Domain Generalization." arXiv preprint arXiv: 2207.12392 (2022), and is incorporated herein by reference in its entirety. The code along with pre-trained models are publicly available at: github.com/maryam089/SDViT.

BACKGROUND

Technical Field

The present disclosure is directed to domain generalization in a vision transformer, in particular a training method for a vision transformer that improves recognition of out-of-distribution images.

Description of Related Art

Since their inception, transformers have displayed remarkable performance in various natural language processing (NLP) tasks. See Vaswani, A., Shazeer, N., Parmar, N., Uszkoreit, J., Jones, L., Gomez, A. N., Kaiser, Ł., Polosukhin, I.: Attention is all you need. Advances in neural information processing systems 30 (2017): Devlin, J., Chang, M. W., Lee, K., Toutanova, K.: Bert: Pre-training of deep bidirectional transformers for language understanding. arXiv preprint arXiv: 1810.04805 (2018); and Brown, T., Mann, B., Ryder, N., Subbiah, M., Kaplan, J. D., Dhariwal, P., Neelakantan, A., Shyam, P., Sastry, G., Askell, A., et al.; Language models are few-shot learners. Advances in neural information processing systems 33 (2020) 1877-1901, each incorporated herein by reference in their entirety. Owing to their success in NLP, recently, transformer design has been adopted for vision tasks. See Dosovitskiy, A., Beyer, L., Kolesnikov, A., Weissenborn, D., Zhai, X., Unterthiner, T., Dehghani, M., Minderer, M., Heigold, G., Gelly, S., et al.; An image is worth 16×16 words: Transformers for image recognition at scale. arXiv preprint arXiv:2010.11929 (2020), incorporated herein by reference in its entirety. Since then, several vision transformer (ViT) models have been developed for image recognition, object detection and semantic segmentation. See Dosovitskiy et al.; Carion, N., Massa, F., Synnaeve, G., Usunier, N., Kirillov, A., Zagoruyko, S.: End-to-end object detection with transformers. In: European conference on computer vision, Springer (2020) 213-229; Zhu, X., Su, W., Lu, L., Li, B., Wang, X., Dai, J.: Deformable detr: Deformable transformers for end-to-end object detection. arXiv preprint arXiv:2010.04159 (2020); Zheng, S., Lu, J., Zhao, H., Zhu, X., Luo, Z., Wang, Y., Fu, Y., Feng, J., Xiang, T., Torr, P. H., et al.; Rethinking semantic segmentation from a sequence-to-sequence perspective with transformers. In: Proceedings of the IEEE/CVF conference on computer vision and pattern recognition. (2021) 6881-6890; and Wang, W., Xie, E., Li, X., Fan, D. P., Song, K., Liang, D., Lu, T., Luo, P., Shao, L.: Pyramid vision transformer: A versatile backbone for dense prediction without convolutions. In: Proceedings of the IEEE/CVF International Conference on Computer Vision. (2021) 568-578, each incorporated herein by reference in their entirety. ViTs are intrinsically different in design compared to convolution neural networks (CNNs), since they lack explicit inductive biases such as, spatial connectivity and translation equivariance. They process (input) an image as a sequence of patches that is enhanced via successive transformer blocks (comprised of self-attention mechanisms), thereby allowing the network to model relationship between any parts of the image. A useful consequence of such a processing is a wide receptive field that facilitates capturing the global context in contrast to a limited receptive field modelled in CNNs.

However, application of transformers to images has still not achieved the performance that has been achieved in natural language processing. Vision transformers suffer from performance degradation when facing out-of-distribution target domain data. Subsequently, an objective of vision transformers is to address degradation when facing out-of-distribution domain data through domain generalization. The goal of machine learning is to design a model that can learn general and predictive knowledge from training data, and then apply the model to new (test) data. Supervised learning models are trained based on the i.i.d. assumption that training and testing data are identically and independently distributed. However, this assumption does not always hold in reality. Collecting the data of all possible domains to train supervised learning models is expensive and even prohibitively impossible.

The goal of domain generalization is to learn a robust and generalizable predictive function from the training domains to achieve a minimum prediction error on an unseen test domain. In supervised learning, the datasets are split into a training and a test dataset. Training is done with the training dataset. Testing of model performance is done on the test dataset. An inbuilt assumption while splitting the data into train-validation-test set is the assumption of I.I.D. If the distributions between training and test set is different or if there are in-built sampling dependencies, the algorithm won't be able to generalize once it is deployed/live.

A fundamental principle that governs this idea of domain generalization is called Empirical Risk Minimization (ERM). ERM conveys that it is impossible to compute true risk associated with hypothesis h which maps feature vectors X to labels Y since the true distribution of the complete data the algorithm will work on is unknown. In other words, the risk cannot be computed because the distribution is unknown to the learning algorithm (this situation is referred to as agnostic learning). However, an approximation, called empirical risk, can be computed by averaging the loss function on the training set: more formally, computing the expectation with respect to the empirical measure. Hence, empirical risk is computed by averaging the loss function on the training data and focusing on choosing the best hypothesis to minimize the empirical risk.

For real world scenarios, supervised learning models are capable of being deployed in applications where the test data is unknown in advance. This is especially important when their predictions are used for decision making in safety-critical applications, such as medical diagnosis or self-driving car. In such case, an erroneous prediction can lead to dangerous consequences. This typically occurs because there is a distributional gap between the training and testing data. Hence, it is critical for deep learning models to provide reliable predictions that generalize across the different domains. Domain generalization (DG) is a problem setting in which data from multiple source domains is leveraged for training to generalize to a new (unseen) domain. See Muandet, K., Balduzzi, D., Schölkopf, B.: Domain generalization via invariant feature representation. In: International Conference on Machine Learning. (2013) 10-18: Ghifary, M., Bastiaan Kleijn, W., Zhang, M., Balduzzi, D.: Domain generalization for object recognition with multi-task auto-encoders. In: Proceedings of the IEEE international conference on computer vision. (2015) 2551-2559; Li, D., Yang, Y., Song, Y. Z., Hospedales, T. M.: Deeper, broader and artier domain generalization. In: Proceedings of the IEEE international conference on computer vision. (2017) 5542-5550; Carlucci, F. M., D'Innocente, A., Bucci, S., Caputo B., Tommasi, T.: Domain generalization by solving jigsaw puzzles. In: Proceedings of the IEEE Conference on Computer Vision and Pattern Recognition. (2019) 2229-2238; Gulrajani, I., Lopez-Paz, D.: In search of lost domain generalization. ArXiv abs/2007.01434 (2021); Huang, Z., Wang, H., Xing, E. P., Huang, D.: Self-challenging improves cross-domain generalization. (2020): Khan, M. H., Zaidi, T., Khan, S., Khan, F. S.: Mode-guided feature augmentation for domain generalization. (2021); Nam, H., Lee, H., Park, J., Yoon, W., Yoo, D.: Reducing domain gap by reducing style bias. In: Proceedings of the IEEE/CVF Conference on Computer Vision and Pattern Recognition (CVPR). (2021) 8690-8699; Kim, D., Yoo, Y., Park, S., Kim, J., Lee, J.: Selfreg: Self-supervised contrastive regularization for domain generalization. In: Proceedings of the IEEE/CVF International Conference on Computer Vision (ICCV). (2021) 9619-9628; and Bui, M. H., Tran, T., Tran, A., Phung, D.: Exploiting domain-specific features to enhance domain generalization. Advances in Neural Information Processing Systems 34 (2021), each incorporated herein by reference in their entirety. Existing DG methods aim to explicitly reduce domain gap in the feature space, learn well-transferable model parameters through meta-learning, propose different data augmentation techniques, or leverage auxiliary tasks. See Muandet et al.; Ganin, Y., Ustinova, E., Ajakan, H., Germain, P., Larochelle, H., Laviolette, F., Marchand, M., Lempitsky, V.: Domain-adversarial training of neural networks. The Journal of Machine Learning Research 17 (2016) 2096-2030; Li, H., Pan, S. J., Wang, S., Kot, A. C.: Domain generalization with adversarial feature learning. In: Proceedings of the IEEE conference on computer vision and pattern recognition. (2018) 5400-5409: Li, D., Yang, Y., Song, Y. Z., Hospedales, T. M.: Learning to generalize: Meta-learning for domain generalization. In: Thirty-Second AAAI Conference on Artificial Intelligence. (2018): Dou, Q., de Castro, D. C., Kamnitsas, K., Glocker, B.: Domain generalization via model-agnostic learning of semantic features. In: Advances in Neural Information Processing Systems. (2019) 6450-6461: Balaji, Y., Sankaranarayanan, S., Chellappa, R.: Metareg: Towards domain generalization using meta-regularization. In: Advances in Neural Information Processing Systems. (2018) 998-1008: Li, D., Zhang, J., Yang, Y., Liu, C., Song, Y. Z., Hospedales, T. M.: Episodic training for domain generalization. In ICCV (2019); Khan et al.; Shankar, S., Piratla, V., Chakrabarti, S., Chaudhuri, S., Jyothi, P., Sarawagi, S.: Generalizing across domains via cross-gradient training. arXiv preprint arXiv: 1804.10745 (2018); Volpi, R., Namkoong, H., Sener, O., Duchi, J. C., Murino, V., Savarese, S.: Generalizing to unseen domains via adversarial data augmentation. In: Advances in Neural Information Processing Systems. (2018) 5334-5344; Zhou, K., Yang, Y., Hospedales, T., Xiang, T.: Learning to generate novel domains for domain generalization. (2020); Carlucci et al.; and Wang, S., Yu, L., Li, C., Fu, C. W., Heng, P. A.: Learning from extrinsic and intrinsic supervisions for domain generalization. (2020), each incorporated herein by reference in their entirety. Lately, Gulrajani and Lopez-Paz show that a simple Empirical Risk Minimization (ERM) method obtains favourable performance against previous methods under a fair evaluation protocol termed as "Domainbed". See Gulrajani et al. To our knowledge, almost all aforementioned DG approaches are based on CNNs, and there is little to no work on studying the DG performance of ViTs. So, in effect, despite ViTs demonstrating state-of-the-art performance on some standard benchmarks, often rooted in i.i.d assumption, their real-world deployment remain doubtful. To this end, it is an objective of machine learning to develop ViTs that improve solution of the DG problem.

Several conventional domain generalization (DG) methods have an objective to learn the underlying domain-invariant representations from the available source data. The seminal work of Vapnik et al. introduced the above-mentioned Empirical Risk Minimization (ERM), which minimizes the sum of squared errors across domains. See Vapnik, V.: The nature of statistical learning theory. Springer science & business media (1999), incorporated herein by reference in its entirety. Following this route, there have been several variants aimed at uncovering the domain-invariant features via matching distributions across domains. For instance, Muandet et al. employed maximum mean discrepancy (MMD) constraint, Ghifary et al. proposed a multi-task autoencoder, and Yang et al. used canonical correlation analysis (CCA). See Muandet et al., Ghifary et al., and Yang, P. Y., Gao, W.: Multi-view discriminant transfer learning. (2013), each incorporated herein by reference in their entirety. Arjovsky et al. proposed the learning of invariant predictors across various source domains. See Arjovsky, M., Bottou, L., Gulrajani, I., Lopez-Paz, D.: Invariant risk minimization. arXiv preprint arXiv: 1907.02893 (2019), incorporated herein by reference in its entirety. A few methods used low rank regularization to extract invariant features. See Li et al. and Xu, Z., Li, W., Niu, L., Xu, D.: Exploiting low-rank structure from latent domains for domain generalization. In: European Conference on Computer Vision, Springer (2014) 628-643, each incorporated herein by reference in their entirety. Meta-learning based methods have also been used as regularizers. Li et al. switched domain-specific feature extractors and classifiers across domains via episodic training. Balaji et al. learned a regularization function in an episodic training paradigm. Furthermore, some DG methods masked features via ranking gradients, utilized auxiliary tasks, employed domain-specific masks, and exploited domain-specific normalizations. See Huang et al.; Carlucci et al.; Wang et al.; Chattopadhyay, P., Balaji, Y., Hoffman, J.: Learning to balance specificity and invariance for in and out of domain generalization. (2020); and Seo, S., Suh, Y., Kim, D., Kim, G., Han, J., Han, B.: Learning to optimize domain specific normalization for domain generalization. (2020), each incorporated herein by reference in their entirety. A few DG approaches proposed contrastive semantic alignment and self-supervised contrastive formulations. See Kim et al.; Dou et al.; and Motiian, S., Piccirilli, M., Adjeroh, D. A., Doretto, G.: Unified deep supervised domain adaptation and generalization. In: Proceedings of the IEEE International Conference on Computer Vision. (2017) 5715-5725, each incorporated herein by reference in their entirety. Another class of DG methods employ various data augmentation techniques to improve the diversity of source domains. Shankar et al. proposed Crossgrad training, Volpi et al. imposed wasserstein constraint in semantic space, Zhou et al. learned a generator to generate new examples, and Khan et al. estimated class-conditional covariance matrices for generating novel source features. Recently, Gulrajani et al.

demonstrated that, under a fair evaluation protocol, a simple empirical risk minimization (ERM) method can achieve state-of-the-art DG performance. Cha et al. proposed stochastic weight averaging in a dense manner to achieve flatter minima for DG. It is noted that, all aforementioned DG methods are based on CNN architecture. However, little to no attention has been paid towards investigating the DG performance of ViTs. To this end, the performance of ViTs under domain generalization with ERM is a potential simple, but strong DG baseline.

Vision transformers operate in a hierarchical manner by processing input images as a sequence of non-overlapping patches via the self attention mechanism. Recently, ViT-based methods have been used for image classification, object detection, and semantic segmentation. See Dosovitskiy et al.; Wu, H., Xiao, B., Codella, N., Liu, M., Dai, X., Yuan, L., Zhang, L.: Cvt: Introducing convolutions to vision transformers. In: Proceedings of the IEEE/CVF International Conference on Computer Vision. (2021) 22-31: Touvron, H., Cord, M., Douze, M., Massa, F., Sablayrolles, A., Jégou, H.: Training data-efficient image transformers & distillation through attention. In: International Conference on Machine Learning, PMLR (2021) 10347-10357; Carion et al.; Dai, X., Chen, Y., Yang, J., Zhang, P., Yuan, L., Zhang, L.: Dynamic detr: End-to-end object detection with dynamic attention. In: Proceedings of the IEEE/CVF International Conference on Computer Vision (ICCV). (2021) 2988-2997: Strudel, R., Garcia, R., Laptev, I., Schmid, C.: Segmenter: Transformer for semantic segmentation. In: Proceedings of the IEEE/CVF International Conference on Computer Vision. (2021) 7262-7272; and Lu, Z., He, S., Zhu, X., Zhang, L., Song, Y. Z., Xiang, T.: Simpler is better: Few-shot semantic segmentation with classifier weight transformer. In: Proceedings of the IEEE/CVF International Conference on Computer Vision. (2021) 8741-8750, each incorporated herein by reference in their entirety. Dosovitskiy et al. proposed the first fully functional ViT model for image classification. Despite its promising performance, its adoption remained limited because it requires large-scale datasets for model training and huge computation resources.

Several approaches have been developed as improvements to the original vision transformer. Towards improving data efficiency in ViTs, Touvron et al. developed Data-efficient image Transformer (DeiT) that is an approach to improving data efficiency in vision transformers. The DeiT attains competitive results against the CNN by training only on ImageNet and without leveraging external data. Similarly, Yuan et al. proposed Tokens-To-Token Vision Transformer (T2T-ViT) strategy. See Yuan, L., Chen, Y., Wang, T., Yu, W., Shi, Y., Jiang, Z. H., Tay, F. E., Feng, J., Yan, S.: Tokens-to-token vit: Training vision transformers from scratch on imagenet. In: Proceedings of the IEEE/CVF International Conference on Computer Vision. (2021) 558-567, incorporated herein by reference in its entirety. The T2T-ViT progressively structurizes the patch tokens in a way that the local structure represented by surrounding tokens can be modeled while reducing the tokens length. Furthermore, Wu et al. proposed a hybrid approach, namely Convolutional Vision Transformer (CvT), by combining the strengths of CNNs and ViTs aimed at improving the performance and robustness of ViTs, while maintaining computational and memory efficiency. Recently, Zhang et al. studied the performance of ViTs under distribution shifts and proposed a generalization-enhanced vision transformer from the outlook of self-supervised learning and information theory. See Zhang, C., Zhang, M., Zhang, S., Jin, D., Zhou, Q., Cai, Z., Zhao, H., Yi, S., Liu, X., Liu, Z.: Delving deep into the generalization of vision transformers under distribution shifts. arXiv preprint arXiv:2106.07617 (2021), incorporated herein by reference in its entirety. Zhang et al. concluded that by scaling the capacity of ViTs the out-of-distribution (OOD) generalization performance can be enhanced, mostly under the domain adaptation settings. On the other hand, it is desireable to improve the OOD generalization performance of ViTs without introducing any new parameters under the established DG protocols. See Gulrajani et al.

A technique of knowledge distillation was initially designed for model compression and aimed at matching the output of a teacher model to a student model whom capacity is smaller than the teacher model. See Hinton, G., Vinyals, O., Dean, J.: Distilling the knowledge in a neural network (2015). arXiv preprint arXiv: 1503.02531 2 (2015), incorporated herein by reference in its entirety. Zhang et al. also aimed at model compression by partitioning a CNN model into several blocks, and the knowledge from the full (deeper part) of the model is squeezed into the shallow parts. See Zhang, L., Song, J., Gao, A., Chen, J., Bao, C., Ma, K.: Be your own teacher: Improve the performance of convolutional neural networks via self distillation. In: Proceedings of the IEEE/CVF International Conference on Computer Vision. (2019) 3713-3722, incorporated herein by reference in its entirety. Yun et al. proposed a self-distillation approach based on penalizing the predictive distributions between similar data samples. See Yun, S., Park, J., Lee, K., Shin, J.: Regularizing class-wise predictions via self-knowledge distillation. In: Proceedings of the IEEE/CVF conference on computer vision and pattern recognition. (2020) 13876-13885, incorporated herein by reference in its entirety. In particular, the approach in Yun et al. distills the predictive distribution between different samples of the same label during training. Towards addressing DG problem, Wang et al. proposed a teacher-student distillation strategy, based on CNNs, and a gradient filter as an efficient regularization term. See Wang, Y., Li, H., Chau, L.p., Kot, A. C.: Embracing the dark knowledge: Domain generalization using regularized knowledge distillation. In: Proceedings of the 29th ACM International Conference on Multimedia. (2021) 2595-2604, incorporated herein by reference in its entirety.

It is an object to obtain a self-distillation strategy to enhance the DG capabilities of ViTs. It is an object to avoid introducing any new parameters in the architecture of ViTs.

SUMMARY

An aspect of the present disclosure is a method of processing in a vision transformer neural network for classification of a medical image, the vision transformer neural network having a sequence of feature extraction transformer blocks and a classifier component. The method can include a training cycle of providing a training dataset including at least two domains for the medical image: receiving, in processing circuitry, a plurality of image patches and initial class tokens obtained from the training dataset: processing, by the processing circuitry, the image patches and the initial class tokens by the sequence of feature extraction transformer blocks to obtain a predicted class token: extracting, by the processing circuitry, intermediate class tokens as outputs of each of the feature extraction transformer blocks, where each transformer block is a sub-model: randomly sampling, by the processing circuitry, one sub-model from the sub-models to obtain a sampled intermediate class token; making a sub-model prediction, by the processing circuitry, by passing the sampled intermediate class token through the classifier component; and determining, by the processing circuitry, a difference between the predicted class token and the sub-model prediction and optimizing the vision transformer neural network based on the difference; and inferencing by receiving, in the processing circuitry, a plurality of target image patches for a target medical image in a target domain that is different from the at least two domains; and predicting, by the processing circuit, a class of the target medical image using the optimized vision transformer neural network.

A further aspect of the present disclosure is an apparatus for classification of medical images obtained from a plurality of medical imaging source devices for diagnosis of a predetermined medical condition. The apparatus can include an input for receiving one at a time a training medical image of the medical images: processing circuitry configured to train a vision transformer neural network by splitting the medical image into a plurality of image patches and receiving initial class tokens, processing the image patches and the initial class tokens by a sequence of feature extraction transformer blocks to obtain a predicted class token, extracting intermediate class tokens as outputs of each of the feature extraction transformer blocks, where each transformer block is a sub-model, randomly sampling one sub-model from the sub-models to obtain a sampled intermediate class token, making a sub-model prediction by passing the sampled intermediate class token through a classifier component, and determining a difference between the predicted class token and the sub-model prediction and optimizing the vision transformer neural network based on the difference; and the processing circuitry configured for inferencing by receiving a plurality of target image patches for a target medical image received from a medical imaging source device that is different from the source devices for the training medical images; and predicting a class of the target medical image using the optimized vision transformer neural network.

A further aspect of the disclosure is a non-transitory computer readable storage medium storing program instructions, which when processed by a machine learning engine perform a method that can include a training cycle for a vision transformer neural network of providing a training dataset including at least two domains for a medical image: receiving a plurality of image patches and initial class tokens obtained from the training dataset: processing the image patches and the initial class tokens by a sequence of feature extraction transformer blocks to obtain a predicted class token: extracting intermediate class tokens as outputs of each of the feature extraction transformer blocks, where each transformer block is a sub-model: randomly sampling one sub-model from the sub-models to obtain a sampled intermediate class token: making a sub-model prediction by passing the sampled intermediate class token through a classifier component; and determining a difference between the predicted class token and the sub-model prediction and optimizing the vision transformer neural network based on the difference; and inferencing by receiving a plurality of target image patches for a target medical image in a target domain that is different from the at least two domains; and predicting a class of the target medical image using the optimized vision transformer neural network.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
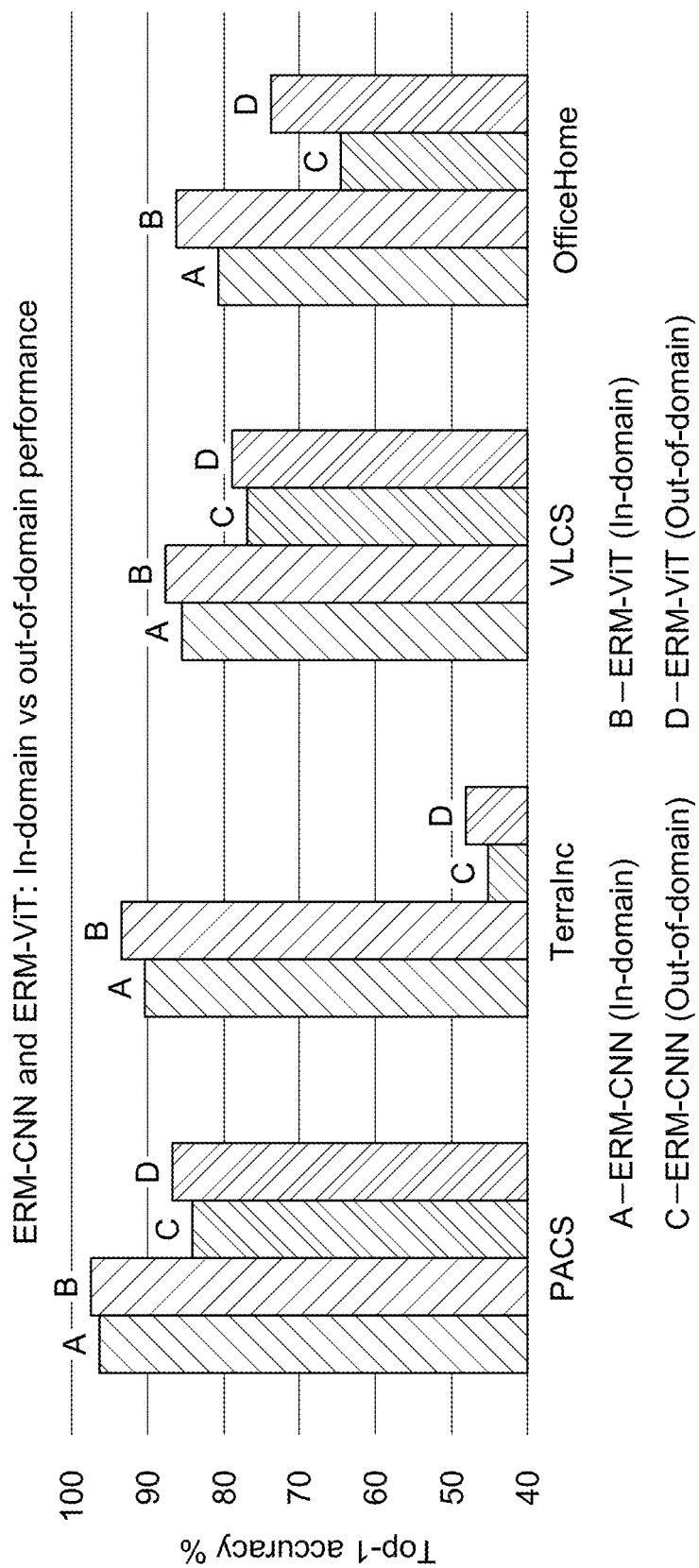
FIG. 1 is a graph of in-domain and out-of-domain classification accuracy of ERM-CNN and ERM-ViT.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The present disclosure provides a self-distilled ViT as a solution to the DG problem. The Self-distillation strategy in a ViT is a simple and light-weight approach to alleviate the problem of overfitting to source domains. It provides soft supervision to the intermediate blocks of ViTs to strengthen their internal representations, thereby moderating the learning of input-output mapping problem. Moreover, it avoids introduction of any new parameters and can be easily plugged into various ViT architectures, owing to their monolithic and modular architecture. Experimental results on five datasets with different DG baselines and VIT backbones, including comparisons with the recent state of the art (SOTA), validate the effectiveness of the self-distilled approach for ViT for tackling DG problem.

For purposes of this disclosure, a domain is defined as a joint distribution in the space of a feature and the space of a label for the feature obtained from the same source. As a non-limiting example, images of objects taken by a DSLR camera is considered as a source domain. Images of the objects taken by a webcam is considered as another source domain. In DG of classification tasks, one is given m sample sets, which were generated from m source domains, for model training. The goal is to incorporate the knowledge learned from the source domains to improve the model generalization ability on an unseen target domain.

Conventional vision transformers often fail to generalize out-of-distribution, with high failure rate when tested outside the domain of training examples. For instance, self-driving car systems struggle to perform under conditions different to those of training, including variations in light, weather, and object poses. Medical imaging systems trained on medical data in a lab environment may fail to generalize to real-world clinical data. Also, a medical imaging system trained with data collected in one hospital or using one medical imaging device do not generalize to other health centers or other medical imaging devices. Different institutions may differ in terms of their imaging equipment, image acquisition parameters, and contrast injection protocols which might notably affect imaging characteristics. Images may be obtained from different sources collected under different conditions (e.g., viewpoints, illumination, backgrounds). Furthermore, the lack of domain generalization of artificial neural networks is an important obstacle to their deployment in changing clinical environments. As such, the behavior of vision transformer systems out-of-distribution is a roadblock to their deployment in critical real-world applications.

As noted above, training using a loss function based on ERM has achieved superior performance when compared to conventional domain generalization alternatives. This would imply that a solution to the DG problem in vision transformers is training a vision transformer based on ERM. However, contrary to an expected result of achieving improved DG when using ERM, an ERM approach to ViT (ERM-ViT), it has been found that similar to its CNN-based counterpart (ERM-CNN), the ViT also suffers from performance degradation when facing out-of-distribution (OOD) target domain data.

FIG. 1 is a graph of in-domain (validation) and out-of-domain (target) classification accuracy of both ERM-CNN and ERM-ViT in four DG datasets. Similar to ERM-CNN, ERM-ViT also shows performance degradation in out-of-domain scenarios.

A reason for this performance degradation appears to be that the absence of any explicit overfitting prevention mechanism coupled with the one-hot encoded ground-truth supervision, which are essentially zero-entropy signals, make it challenging for a direct ERM-ViT model to obtain favorable OOD generalization. In particular, since the mapping problem is difficult, the model is prone to inadvertently exploiting non-generalizable, brittle features for making predictions.

Figure 2:
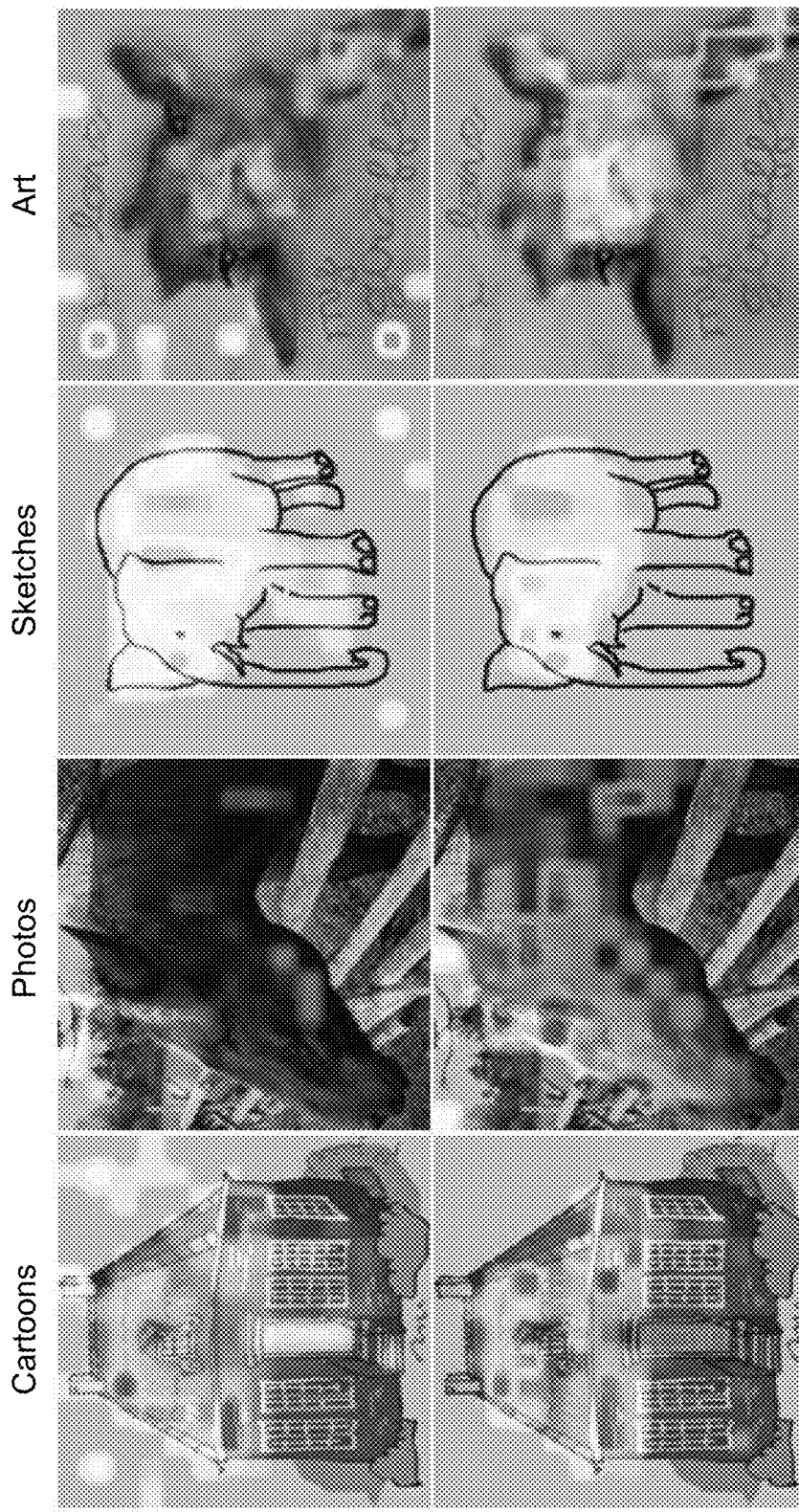
FIG. 2 illustrates attention maps to show that ERM-ViT is prone to exploiting non-generalizable features.

FIG. 2 illustrates attention maps from ERM-ViT on arbitrary images of four target domains in PACS dataset. Based on these results, ERM-ViT has a tendency to rely on non-object related features such as the background features, which are potentially non-transferable between the source and the target domains. As will be explained further below, the present ERM-SDViT is capable of learning cross-domain generalizable features e.g., object shape and its semantics.

Disease detection algorithms driven by AI have demonstrated to be an effective tool for identifying undiagnosed patients with under-diagnosed, uncoded, and rare diseases. However, there is a possibility that the training data may produce incorrect analysis of disease because of insufficient information, which artificial intelligence cannot factor. One reason for insufficient information is that training is typically performed in a lab, whereas real world examination occurs in a clinic, which can take on a variety of environmental factors. As a result, AI cannot assure whether the prediction regarding disease detection is accurate. It has been found that including more heterogeneous data from a wider range of scanners and protocols during training can improve the performance in OOD data. Still, much work is required to train the AI-based systems so that there will be an increase in the accuracy to recognize disease in clinical medical images.

In a recent example, diabetic retinopathy is a disease that can cause blindness if not caught early. However, there are few retinal specialists relative to the number of people with diabetes. Also, typically nurses take phots of patient's eyes during check-ups and send them off to be looked at by a specialist. In order to speed up this process so that more patients can be examined and diagnosed early, it may be beneficial to deploy a deep-learning system trained to spot signs of eye disease in patients with diabetes.

However, machine learning models trained in a lab may fail to generalize to clinical environments. A machine learning model for image recognition would typically be trained on high-quality scans using specific medical devices. In a real-world clinic environment, scans may be taken in poor lighting conditions and using settings that can lead to poor quality images being used in the diagnosis. The real-word clinic environments may involve various machines and settings.

Figure 3:
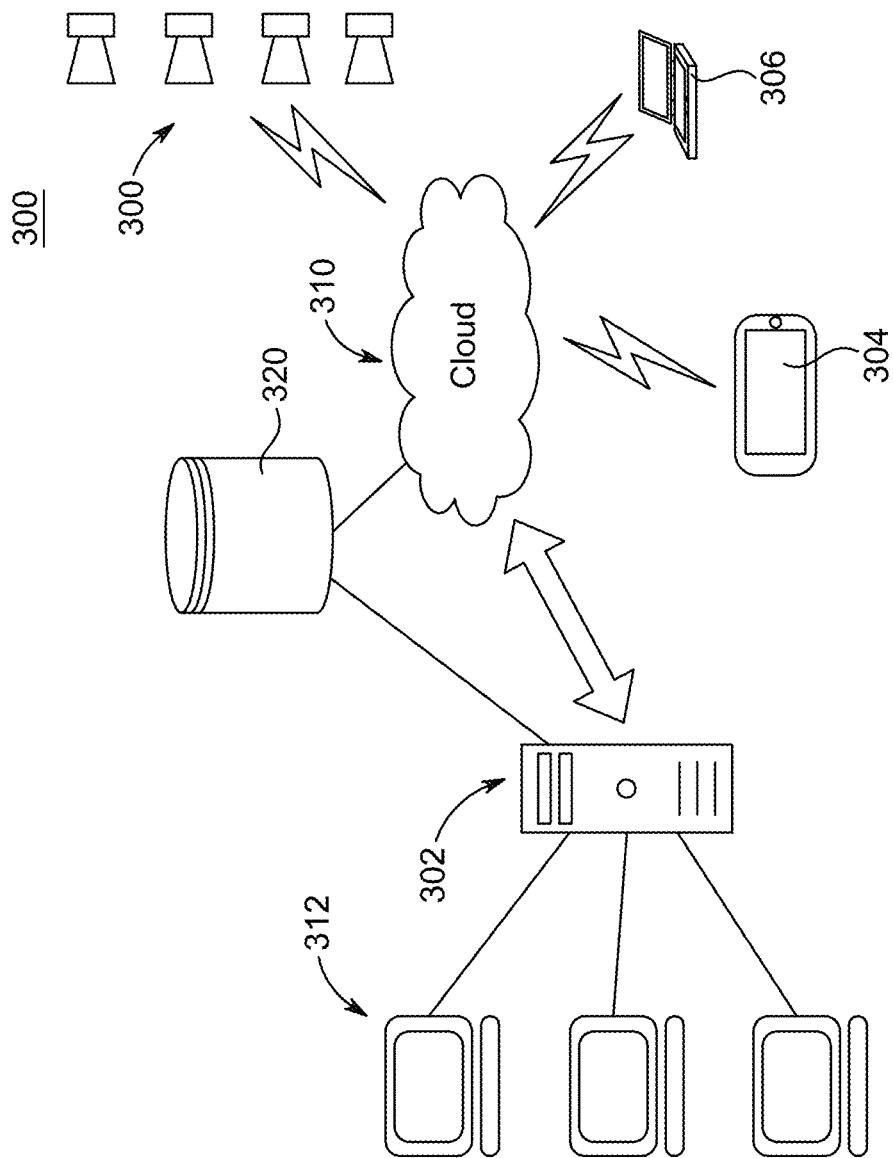
FIG. 3 is a system diagram for a medical imaging service.

FIG. 3 is a diagram of a machine learning system in accordance with an exemplary aspect of the disclosure. In an exemplary embodiment, a server 302 or artificial intelligence (AI) workstation may be configured for medical diagnosis. The system of FIG. 3 may be part of a hospital system, clinical system, patient medical facility, or may be part of a medical service system. The system is not limited in number of computing devices as shown in the figure, and may include any number of computing devices depending on the needs of the facility. With the system configuration, one or more client computers 312 may be used to perform medical diagnosis in several medical images at a time. In one embodiment, the server 302 may be connected to a cloud service 310. The cloud service 310 may be accessible via the Internet. The cloud service 310 may provide a database system and may serve medical images. Mobile devices 304, 306 may access medical images served by the cloud service 310. Viewers of the medical images served by the cloud service 310 may be provided with an emphasis on a disease prediction.

An aspect is a medical diagnosis service having one or more servers 302 and one or more client computers 312. The medical diagnosis service can determine whether a medical image contains a disease state.

The present vision transformer provides a solution to the domain generalization problem. Contrary to what would be expected for a model that uses ERM, the present inventors have determined that a straight forward DG baseline (ERM) built using ViT results in substantial performance drop in a typical DG setting (FIG. 1). The present vision transformer seeks to achieve a performance gain and in fact provides plug-and-play DG approach for ERM-ViT, referred to as self-distillation for ViTs. The present self-distillation approach explicitly trains the model in a manner that facilitates exploiting cross-domain transferable features (FIG. 2). The present self-distillation approach alleviates the overfitting to the source domains by easing the mapping problem via non-zero entropy supervision of multiple feature pathways that are trained by a comparison with a sequential transformer pathway that is performed in parallel. Furthermore, the present self-distillation approach seamlessly modularizes the architecture of ViTs and avoids introducing any new parameters.

Preliminaries

In a conventional domain generalization (DG) setting, the availability of data is a set of training (source) domains $\mathcal{D}=\{D\}_{k=1}^{K}$. See Gulrajani et al. Where $\mathcal{D}_k$ denotes a distribution over the input space $\mathcal{X}$ and K is the total number of training domains. From a domain k, J training datapoints comprise of input x and label y as pairs $(x_j^k \in \mathcal{X}, y_j^k \in \mathcal{Y}_{j=1}^J$.

Besides a set of training (source) domains, a set of target domains $\{\mathcal{T}\}_{t=1}^{T}$ is assumed, where T is the total number of target domains and is typically set to 1. The goal in DG is to learn a mapping $\mathcal{F}_\theta: \mathcal{X} \to \mathcal{Y}$ that provides accurate predictions on data from an unseen target domain $\mathcal{T}_t$.

A recent successful approach for DG called empirical risk minimization (ERM) assumes a loss function $\mathcal{L}: \mathcal{Y} \times \mathcal{Y}$ which can quantify the prediction error, such as standard Cross Entropy (CE) for image recognition task. A DG baseline accumulates the data from multiple source domains $\mathcal{D}$ and searches for a predictor minimizing the following empirical risk:

$$\frac{1}{N}\sum_{i=1}^{N} \mathcal{L}(\mathcal{F}_\theta(x_k^j), y_k^j)).$$

See Vapnik et al. Where $N=K\times J$ is the total number of data points from all source domains. Recently, Gulrajani and Lopez-Paz demonstrated that this ERM based DG baseline shows competitive results or even performs better than many previous state-of-the-art DG methods under a fair evaluation protocol.

Subsequently, in order to make use of the success of ERM, it would seem that a straight-forward approach would be to directly use ERM on a ViT. However, contrary to expectations, a ViT trained based ERM (ERM-ViT) was found to have a substantial performance drop. The same performance drop was found to occur in an CNN-based ERM counterpart (FIG. 1). One possible reason for this performance drop may be due to a lack of any explicit overfitting mechanism and the supervision from one-hot encoded ground truth labels. Lack of these features may render the overall learning of the mapping problem, from input space to label space, rather difficult. As a result, the straight-forward ERM-ViT model is more prone to exploiting nongeneralizable, brittle features, such as the specific background of a domain (FIG. 2). To tackle the problems that were found in the straight-forward ERM-ViT, a self-distillation technique is provided as a solution that significantly improves the DG capabilities of ViTs. A core feature of the technique is to ease the mapping problem by generating non-zero entropy supervision for training multiple feature pathways in ViTs. This enables the model to utilize more generalizable features (FIG. 2), that are substantially shared across source and target domains.

Self-distilled Vision Transformer for Domain Generalization

The present vision transformer architecture arranges ViT into transformer modules to obtain a light-weight plug-and-play DG approach for ViTs, referred to as self-distillation for VIT (SDVIT), as a solution. The present SDVIT explicitly encourages the model towards learning generalizable, comprehensive features.

Figure 4:
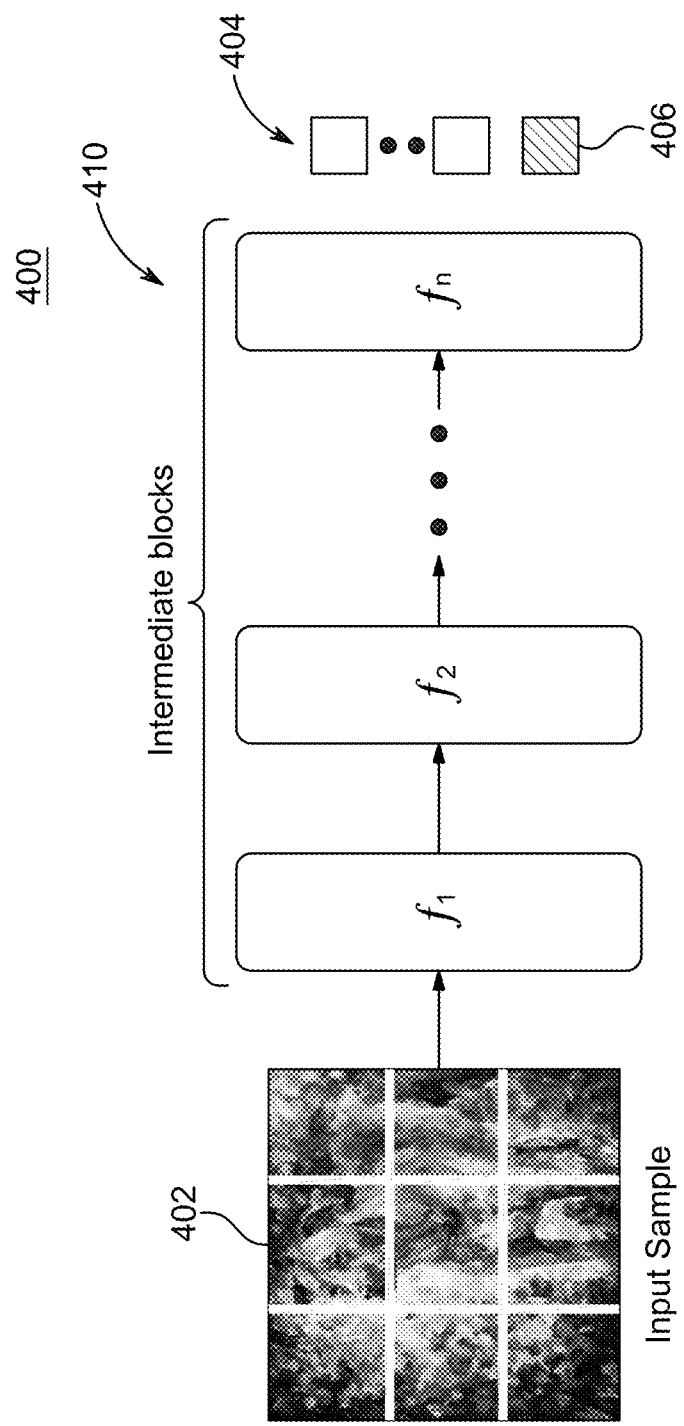
FIG. 4 is a block diagram of an ERM-based vision transformer architecture.

FIG. 4 is a block diagram of a vision transformer architecture. ViTs process a sequence of input image patches 402 repeatedly by multiple multi-headed self-attention layers, that can be arranged as transformer blocks 410. See Vaswani et al. These image patches 402 are also known as patch tokens. A randomly initialized class token 406 is usually appended to the set of image patches (tokens) 404. This group is then passed through a sequence of transformer blocks 410 followed by the passing of class token 406 through a linear classifier to get final predictions. The class token 406 can learn information that is useful while making final prediction. So, it can be extracted from the output of each transformer block and can be leveraged to get class-specific logits using the final classifier of the pretrained model. See Naseer, M., Ranasinghe, K., Khan, S., Khan, F. S., Porikli, F.: On improving adversarial transferability of vision transformers. arXiv preprint arXiv:2106.04169 (2021), incorporated herein by reference in its entirety.

Armed with this insight, the present SDVIT transfers the so-called dark knowledge from the final classifier output to the intermediate blocks by way of a self-distillation strategy for ViT. The SDVIT alleviates the overfitting to source domains by moderating the learning of input-output mapping problem via nonzero entropy supervision of intermediate blocks. By improving training of the intermediate blocks, which are essentially multiple feature pathways, through soft supervision from a final classifier guides the model towards learning cross-domain generalizable features (see FIG. 2). The present approach fits into a modular and compositional architecture of different ViTs, and does not introduce any new parameters. As such the SDVIT adds a minimal training overhead over the baseline ViT.

Extensive experiments have been conducted on five diverse datasets from DomainBed suite, including PACS, VLCS, OfficeHome, TerraIncognita, and DomainNet. See Gulrajani et al. The SDViT achieves better performance across different DG baselines as well as different ViT backbones in all five datasets. Further, the SDViT demonstrates competitive performance against conventional state-of-the-art DG methods. For example, with T2T-ViT-14 backbone, an (overall) average accuracy (five datasets) of 68.1% is obtained, thereby outperforming the existing best models by 1.3%. See Cha, J., Chun, S., Lee, K., Cho, H. C., Park, S., Lee, Y., Park, S.: Swad: Domain generalization by seeking flat minima. Advances in Neural Information Processing Systems 34 (2021), incorporated herein by reference in its entirety.

A ViT is arranged as a modular architecture by arranging the model F of n intermediate layers and arranging the final classifier h as $\mathcal{F} = (f_1 \circ f_2 \circ f_3 \circ \ldots f_n) \circ h$, where $f_i$ represents an intermediate block or layer. In the case of ViT (e.g DeiT-Small), $f_i$ is based on a self-attention transformer block and such network design is monolithic as any transformer block produces equi-dimensional features that is $\mathbb{R}^{m \times d}$, where m represents the number of input features or tokens and each token has d dimensions. See Touvron et al. The monolithic design approach of ViT allows a self-ensemble behavior, where the output of each block can be processed by the final classifier h to create an intermediate classifier. See Naseer et al.

$$\mathcal{F}_i = f_i \circ h \tag{1}$$

A goal is to induce the so-called dark knowledge, non-zero entropy supervisory signals, from the final classifier to these sub-models, manifesting multiple feature pathways.

It is noted that dark knowledge relates to the conflicting constraints of learning and using machine learning models. The easiest way to extract a lot of knowledge from the training data is to learn many different models in parallel. The models should be as different as possible to minimize the correlations between their errors. The models can be made different by using different initializations or different architectures or different subsets of the training data. It is helpful to overfit the individual models. At test time the average of predictions is performed over all the models or of a selected subset of good models that make different errors.

For self-distillation in ViTs, as discussed earlier, ViTs can be dissected into number of sub-models due to their monolithic architectural design as each transformer block 410 produces a classification token 406 that can be processed by the final classification head (Eqn. 1) to produce a class-specific score. Each sub-model represents a discriminative feature pathway through the network. Inducing dark knowledge from a final classifier output to these sub-models via soft supervision during training can enhance the overall model's capability towards learning object semantics.

Figure 5A:
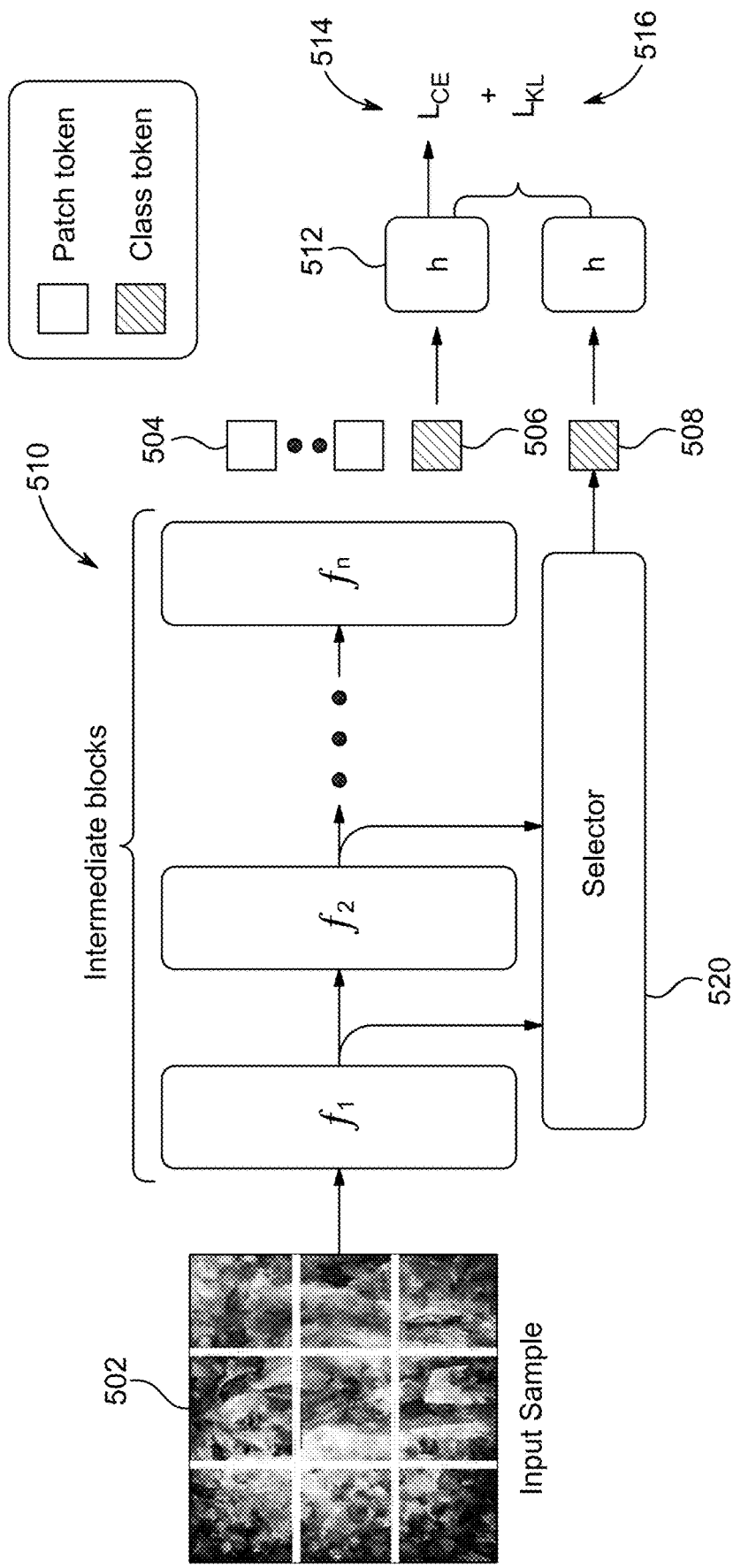
FIG. 5A is a block diagram of an architecture for a self-distilled vision transformer for domain generalization, in accordance with an exemplary aspect of the disclosure.
Figure 5B:
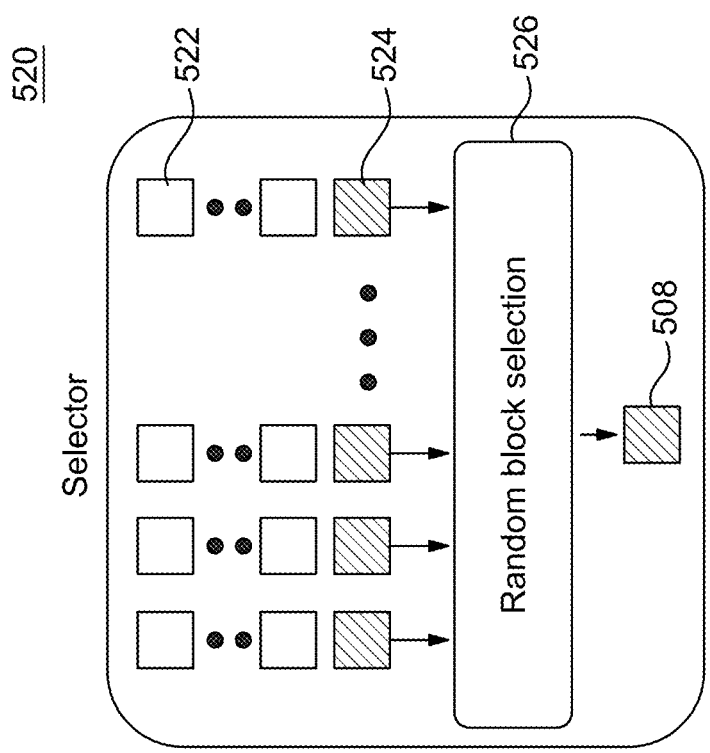
FIG. 5B is a block diagram of a selector component of the architecture of FIG. 5A.
Figure 6A:
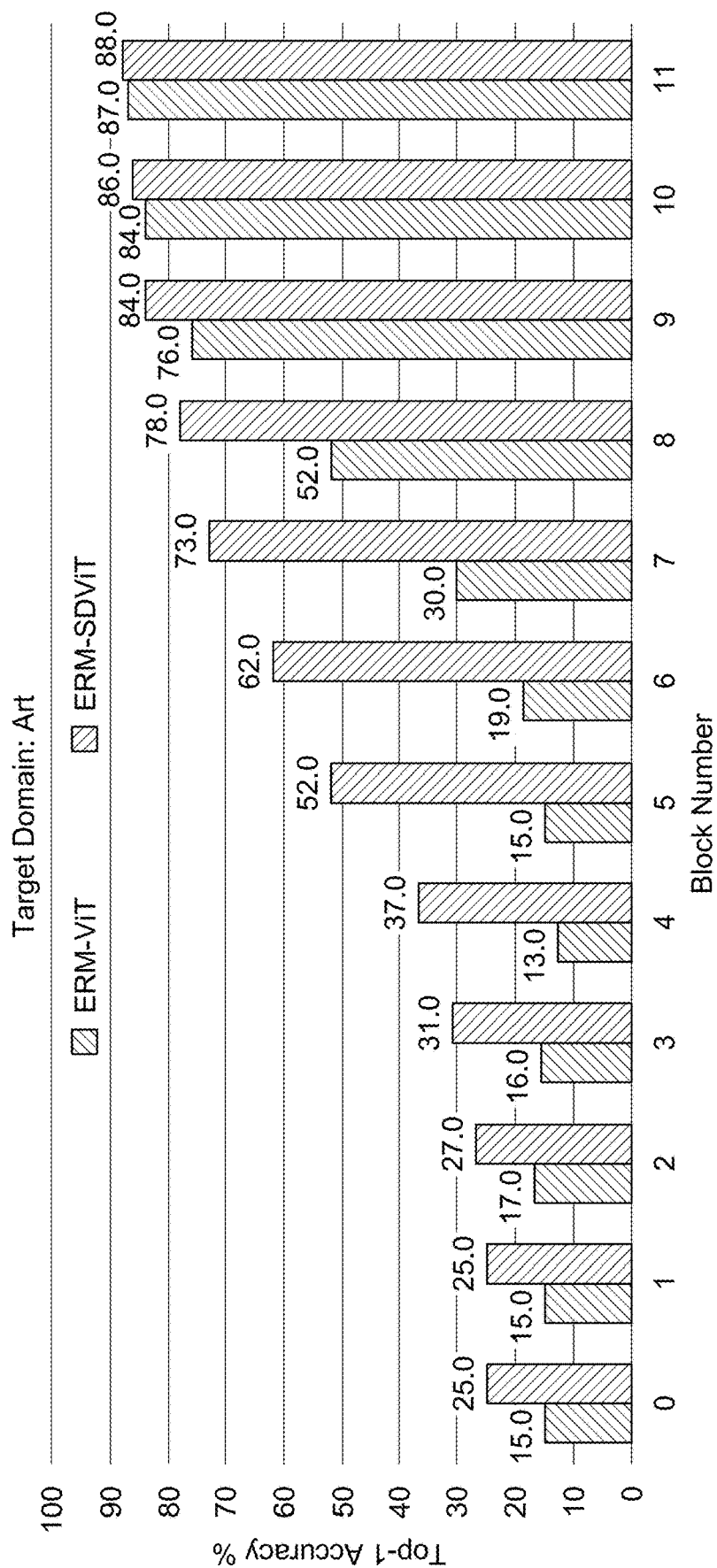
FIGS. 6A, 6B, 6C, 6D are graphs of block-wise accuracy of ERM-ViT and ERM-SDViT using four target domains.
Figure 6B:
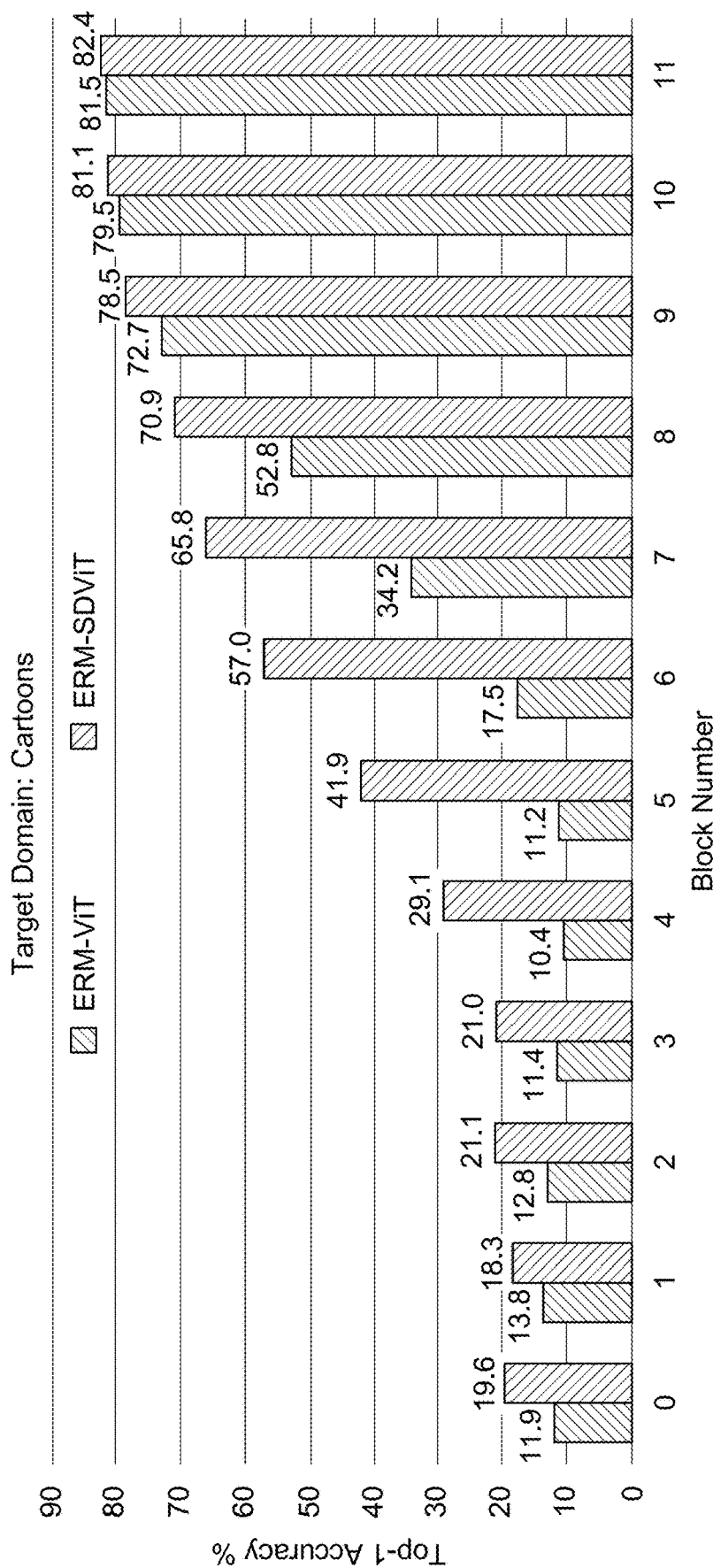
Figure 6C:
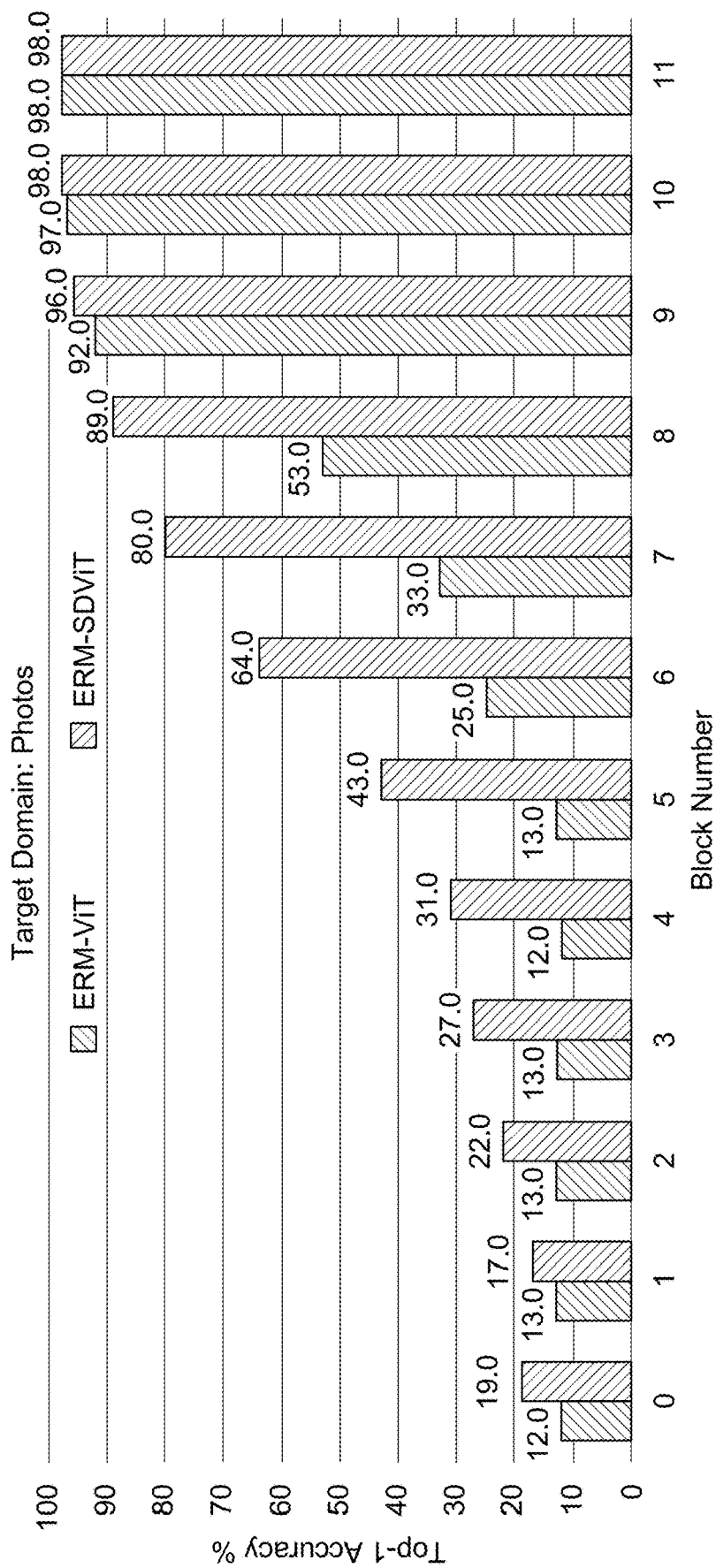
Figure 6D:
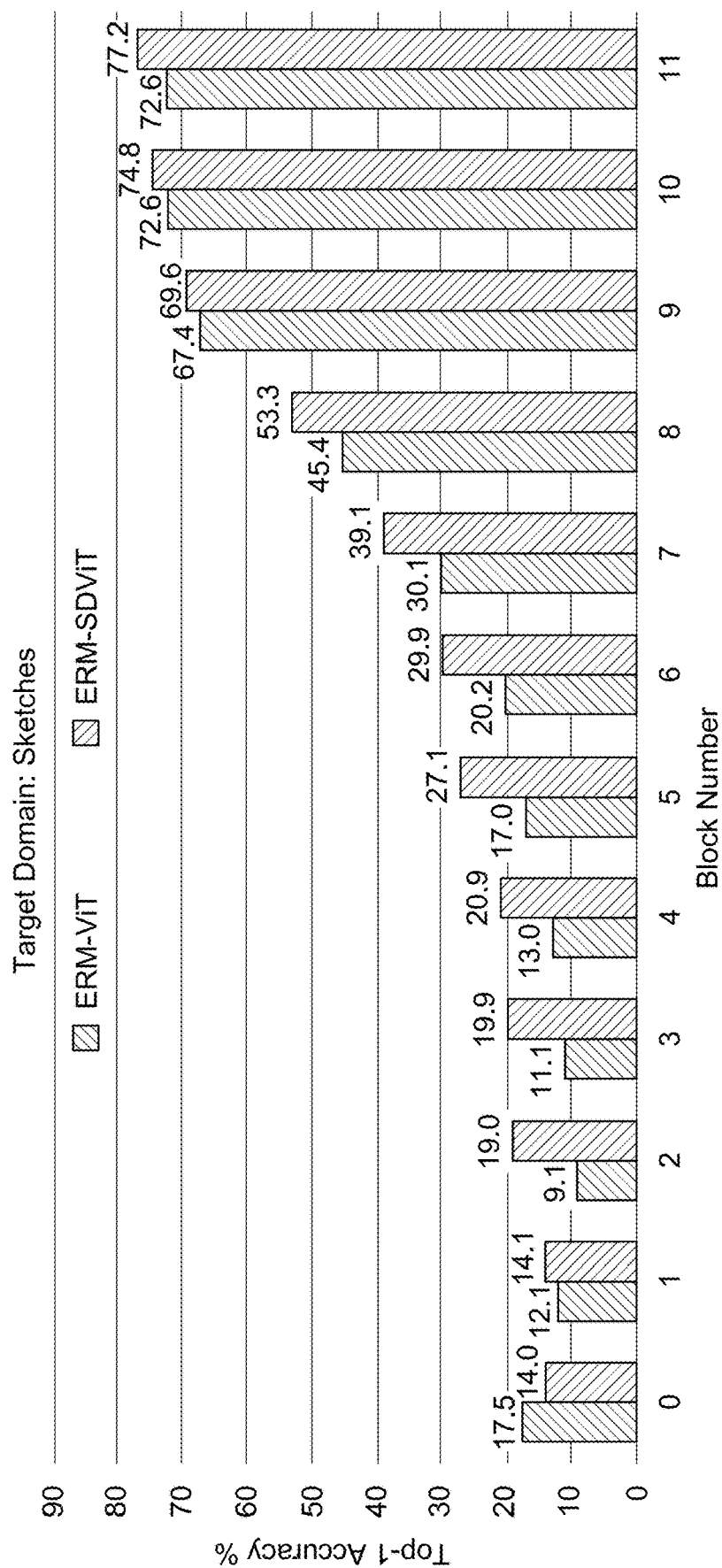

FIG. 5A is a block diagram of an architecture for a self-distilled vision transformer for domain generalization, in accordance with an exemplary aspect of the disclosure. In the present self-distillation in ViTs for domain generalization (ERM-SDViT), the ViT is arranged in a modular and a hierarchical architecture, where a model is comprised of n intermediate blocks/layers ($f_i$) 510 and a final classifier h 512. In FIG. 5B, a Selector 520 chooses (random block selection 526) a random block from the range of intermediate blocks 510 and makes a prediction after passing its classification token 508 through the final classifier 512. This way the dark knowledge, as non-zero entropy signals, is distilled from the final classification token 508 to the intermediate class tokens 522 during training.

In random sub-model distillation, the number of sub-models within a given ViT depends on the number of Transformer blocks 510 and distilling the knowledge to all of the sub-models at once pose optimization difficulties during online training. Therefore, the present technique randomly samples, via selector 520, one sub-model based on Eqn. 1 from all the possible set of sub-models 510. In this manner, the approach trains all sub-models 510 but knowledge is transferred to only a single sub-model at any step of the training. This strategy eases the optimization and leads to better domain generalization.

FIGS. 6A to 6D are plots of the block-wise accuracy of baseline (ERM-ViT) and the present method (ERM-SDViT). FIGS. 6A-6D feature random sub-model distillation for DG. See Touvron et al. Results are for four challenging target domains from PACS dataset.

The random sampling process flow is performed in parallel with the process flow through the transformer blocks 510. The random sub-model distillation improves the accuracy of all blocks, in particular, the improvement is more pronounced for the earlier blocks. Besides later blocks, it also encourages earlier blocks to bank on transferable representations, yet discriminative representations. Since these earlier blocks manifest multiple discriminative feature pathways, the blocks better facilitate the overall model towards capturing the semantics of the object class.

A training objective is that for a given input image x 502, the prediction error from the final classification token 506 of the ViT is computed using cross-entropy loss 514 in comparison with one-hot encoded ground-truths as follows.

$$\mathcal{L}_{CE}(\mathcal{F}(x), y) = -\sum_{j=1}^{n} y_j \log(\mathcal{F}(x)_j), \tag{2}$$

where n is the output dimension of the final classifier 512. The method randomly samples (via selector 520) an intermediate block as shown in FIG. 5B and produces logits from the classification token of a sub-model by applying Eqn. 1. The method then computes the difference between the final and randomly sampled intermediate classification tokens by comparing the KL divergence between their logit distributions as follows 516:

$$x)\|\mathcal{F}_i(x)) = \sum_{j=1}^{n} \sigma(\mathcal{F}(x)/\tau)_j \log \frac{\sigma(\mathcal{F}(x)/\tau)_j}{\sigma(\mathcal{F}_i(x)/\tau)_j}, \tag{3}$$

where $\sigma$ denotes the softmax operation and $\tau$ represent temperature used to rescale the logits. See Hinton et al. The model is optimized by minimizing the overall loss based on Eqns. 2 and 3 and given as follows:

$$\mathcal{L} = \mathcal{L}_{CE} + \lambda \mathcal{L}_{KL}, \tag{4}$$

where $\lambda$ balances the contribution of $\mathcal{L}_{KL}$ towards the overall loss $\mathcal{L}$.

Experiments

Datasets: Following the work of Gulrajani and Lopez-Paz, the effectiveness of the present method has been rigorously evaluated and draw comparisons with the existing state-of-the-art on five benchmark datasets including PACS, VLCS, OfficeHome, TerraIncognita and DomainNet. See Gulrajani et al.; Li et al.; Fang, C., Xu, Y., Rockmore, D. N.: Unbiased metric learning: On the utilization of multiple datasets and web images for softening bias. In: Proceedings of the IEEE International Conference on Computer Vision. (2013) 1657-1664; Venkateswara, H., Eusebio, J., Chakraborty, S., Panchanathan, S.: Deep hashing network for unsupervised domain adaptation. In: Proceedings of the IEEE Conference on Computer Vision and Pattern Recognition. (2017) 5018-5027; Beery, S., Van Horn, G., Perona, P.: Recognition in terra incognita. In: Proceedings of the European conference on computer vision (ECCV). (2018) 456-473; Peng, X., Bai, Q., Xia, X., Huang, Z., Saenko, K., Wang, B.: Moment matching for multi-source domain adaptation. In: Proceedings of the IEEE International Conference on Computer Vision. (2019) 1406-1415, each incorporated herein by reference in their entirety. PACS contains four domains d∈{Art, Cartoons, Photos, Sketches}, 7 classes and a total of 9,991 images. See Li et al. VLCS comprises of four domains as well d∈{Caltech101, LabelMe, SUN09, VOC2007}, 5 classes and offers 10,729 images. See Fang et al. OfficeHome also contains four domains d∈{Art, Clipart, Product, Real}, 65 classes and a total of 15,588 images. See Venkateswara et al. TerraIncognita: has four camera-trap domains d∈{L100, L38, L43, L46}, 10 classes and offers 24,778 wild photographs. See Beery et al. DomainNet contains six domains d∈{Clipart, Infograph, Painting, Quickdraw, Real, Sketch}, 345 classes and 586,575 images. See Peng et al.

Implementation and training testing details: To allow fair comparisons, experiments follow the training and evaluation protocol of Gulrajani and Lopez-Paz. We use the training domain validation protocol for model selection. After partitioning each training domain data into the training and validation subsets (80%/20%), the validation data from each training domain are pooled to obtain an overall validation set. The model that maximizes the accuracy on this overall validation set is considered as the best model which is then evaluated on the target domain to report classification (top-1) accuracy. For all ViT-based methods, including the proposed approach, use AdamW optimizer and use the default hyperparameters (HPs) of ERM from Gulrajani et al., including the batch size of 32, the learning rate of 5e-05, and the weight decay of 0.0. See Loshchilov, I., Hutter, F.: Fixing weight decay regularization in adam. (2018); and Gulrajani et al., each incorporated herein by reference in their entirety. Note that, only the values of the method-specific HPs, $\lambda$ and $\tau$, are sought via grid search in the ranges {0.1, 0.2, 0.5} and {3.0, 5.0}, respectively, using the validation set. The accuracy is reported for each target domain and their average where a model is trained/validated on training domains and evaluated on an (unseen) target domain. Each accuracy on target domain is an average over three different trials with different train-validation splits.

Evaluation with different ViT backbones: The generalizability of the present approach is reported as results with three different ViT backbones, namely DeiT, CvT, and T2T-ViT. See Touvron et al.; Wu et al.; and Yuan et al. In one embodiment, the DeiT backbone is arranged as the intermediate blocks 510. In one embodiment, the CvT backbone is arranged as the intermediate blocks 510. In one embodiment, the T2T-ViT backbone is arranged as the intermediate blocks 510. DeiT is a data-efficient image transformer and was trained on 1.2 million ImageNet examples. The DeiT-Small model has 22M parameters and can be regarded as a ResNet-50 counterpart containing 23.5M parameters. Note that, the DeiT-Small model is used without the distillation token and a student-teacher formulation. CvT introduces convolutions into ViT to improve the accuracy and efficiency. The introduction of convolution allows ViT to handle shift, scale and distortion invariance while retaining the important features of ViTs such as the dynamic attention and global context. The CvT-21 contains 32M parameters in the baselines and the self-distilled ViTs. T2T-ViT relies on a progressive tokenization mechanism to aggregate neighboring Tokens to one Token; it can encode the local structure information of surrounding tokens and reduce the length of tokens iteratively. Further, it builds on an efficient ViT backbone by borrowing architecture designs from CNN. The T2T-ViT-14 model contains 21.5M parameters, which is approximately equivalent to the ResNet-50 model, comprising 23.5M parameters.

DeiT

Figure 7:
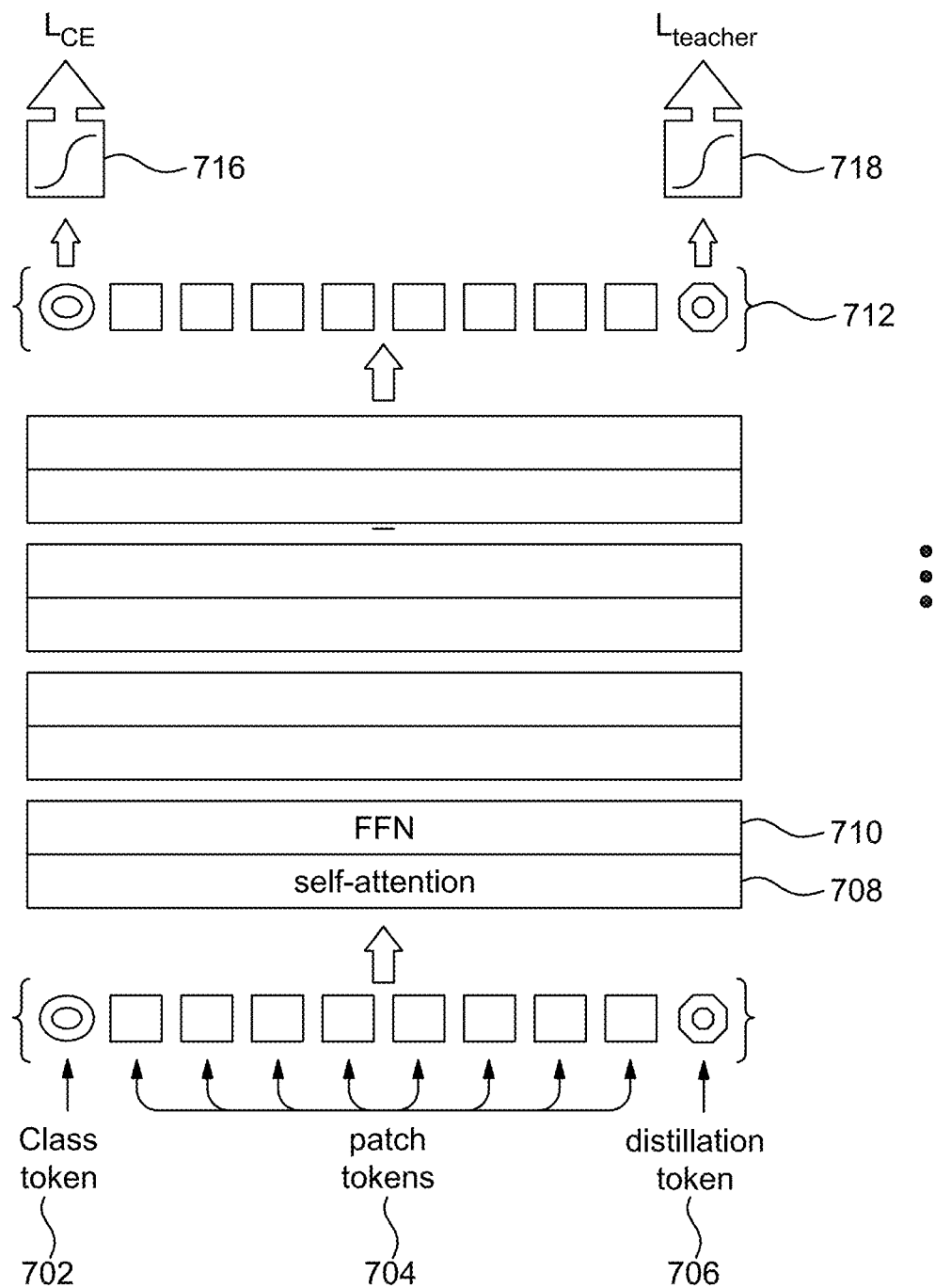
FIG. 7 is a block diagram of an architecture of the DeiT backbone.

FIG. 7 is a block diagram of an architecture of the DeiT. The DeiT model includes a teacher-student strategy specific to transformers. It relies on a distillation token ensuring that the student learns from the teacher through attention. The DeiT model adds a new token, the distillation token 704, to the initial embeddings (patches 704 and class 702 token). The class token is a trainable vector, appended to the patch tokens before the first layer, that goes through the transformer layers, and is then projected with a linear layer to predict the class. The distillation token 706 is used similarly as the class token 702. It interacts with other embeddings through self-attention 708 and is output by the network after the last layer. To get a full transformer block a Feed-Forward Network (FFN) 710 is added on top of the self-attention layer 708. This FFN 710 is composed of two linear layers separated by a GeLu activation.

In an embodiment, the full transformer block 708, 710 is incorporated as a transformer block in 510 of the SDVIT of FIG. 5A, along with the addition of a distillation token to the initial embeddings (patch tokens and class token).

In the original DeiT, the target objective is given by the distillation component of the loss. The target objective uses a hard-label distillation. Hard-label distillation is a variant of distillation where the hard decision of the teacher is taken as a true label. Let $Z_S$ be the logits of the student model. $\mathcal{L}_{CE}$ is the cross-entropy 716, $\psi$ is the softmax function. Let $y_t = \mathrm{argmax} c Z_t(c)$ 718 be the hard decision of the teacher. The objective associated with this hard-label distillation is:

$$L_{global}^{hardDistill} = \frac{1}{2} L_{CE}(\psi(Z_S), y) + \frac{1}{2} L_{CE}(\psi(Z_S), y_t)$$

For a given image, the hard label associated with the teacher may change depending on the specific data augmentation. We will see that this choice is better than the traditional one, while being parameter-free and conceptually simpler: The teacher prediction yt plays the same role as the true label y.

The distillation embedding allows the model to learn from the output of the teacher 712, as in a regular distillation, while remaining complementary to the class embedding.

CvT

Figure 8:
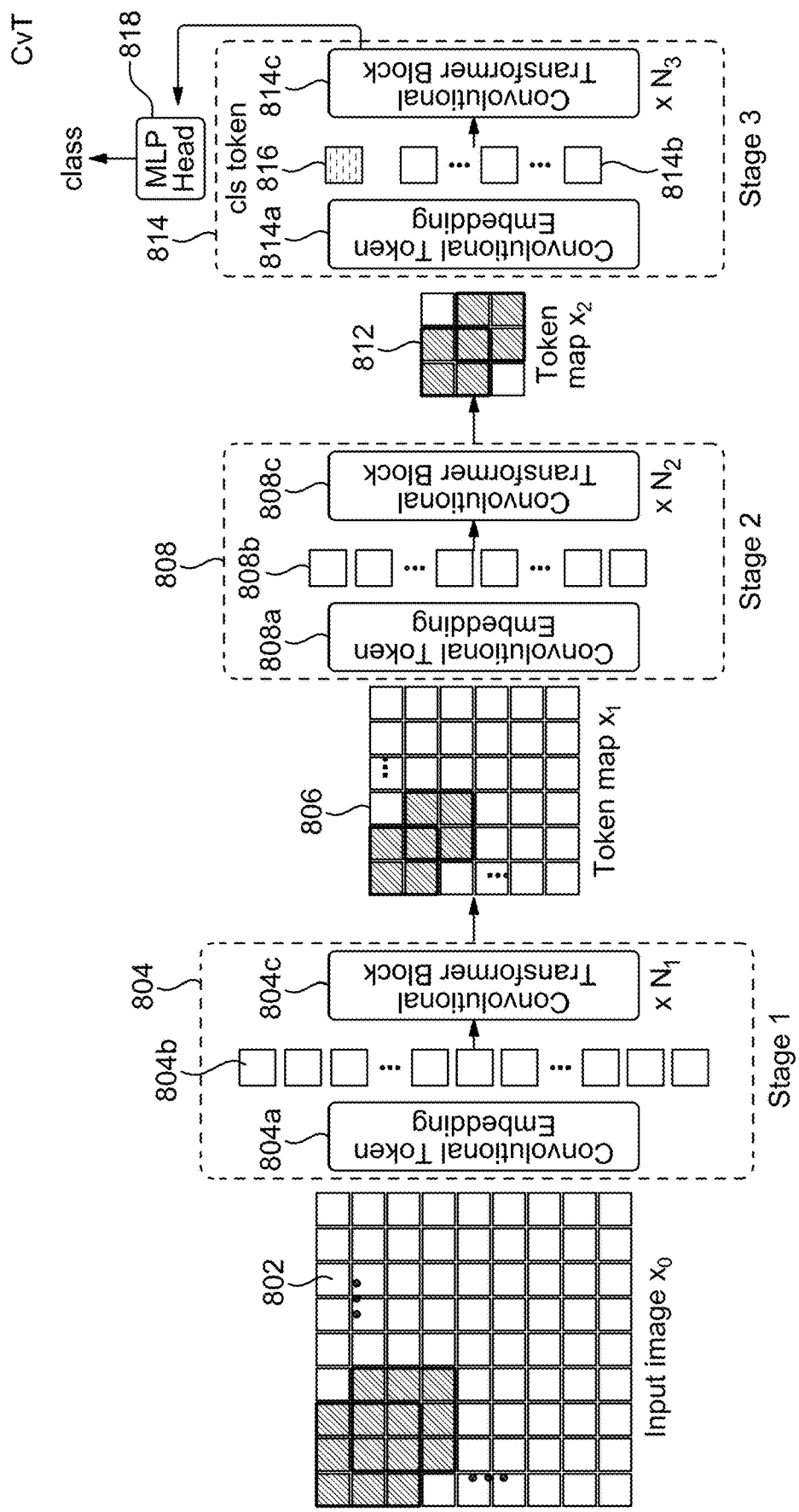
FIG. 8 is block diagram of an architecture of the CvT backbone.

FIG. 8 is the pipeline of the CvT architecture showing the hierarchical multi-stage structure facilitated by the Convolutional Token Embedding layer.

The CvT design introduces convolutions to two core sections of the ViT architecture. First, the Transformers are partitioned into multiple stages 804, 808, 814 that form a hierarchical structure of Transformers. The beginning of each stage consists of a convolutional token embedding that performs an overlapping convolution operation with stride on a 2D-reshaped token map (i.e., reshaping flattened token sequences back to the spatial grid), followed by layer normalization. This allows the model to not only capture local information, but also progressively decrease the sequence length while simultaneously increasing the dimension of token features across stages, achieving spatial downsampling while concurrently increasing the number of feature maps, as is performed in CNNs. Second, the linear projection prior to every self-attention block in the Transformer module is replaced with a convolutional projection, which employs a s×s depth-wise separable convolution operation on an 2D-reshaped token map. This allows the model to further capture local spatial context and reduce semantic ambiguity in the attention mechanism. It also permits management of computational complexity, as the stride of convolution can be used to subsample the key and value matrices to improve efficiency by 4× or more, with minimal degradation of performance.

The Convolutional vision Transformer (CvT) is shown in FIG. 8. Two convolution-based operations are included in the Vision Transformer architecture, namely the Convolutional Token Embedding 804a, 808a, 814a and Convolutional Projection. As shown in FIG. 2, a multi-stage hierarchy design borrowed from CNNs is employed, where three stages 804, 808, 814 in total are used. Each stage has two parts. First, the input image 802 (or 2D reshaped token maps) are subjected to the Convolutional Token Embedding layer 804a, 808a, 814a which is implemented as a convolution with overlapping patches with tokens reshaped to the 2D spatial grid as the input (the degree of overlap can be controlled via the stride length). An additional layer normalization 804b, 808b, 814b is applied to the tokens. This allows each stage to progressively reduce the number of tokens (i.e. feature resolution) while simultaneously increasing the width of the tokens (i.e. feature dimension), thus achieving spatial downsampling and increased richness of representation, similar to the design of CNNs. Different from other Transformer-based architectures, the transformer does not sum the ad-hoc position embedding to the tokens. Next, a stack of the Convolutional Transformer Blocks 804c, 808c, 814c comprise the remainder of each stage. In the architecture of the Convolutional Transformer Block, a depth-wise separable convolution operation, referred as Convolutional Projection, is applied for query, key, and value embeddings respectively, instead of the standard position-wise linear projection in ViT. Additionally, the classification token 816 is added only in the last stage.

In the original CvT, an MLP 818 (i.e. fully connected) Head is utilized upon the classification token of the final stage output to predict the class.

In an embodiment, each of the multiple stages 804, 808, 814 make up the intermediate blocks 510 of the SDVIT of FIG. 5A.

T2T

A Tokens-to-Token Vision Transformer (T2T-ViT) can progressively tokenize the image to tokens and has an efficient backbone. Hence, T2T-ViT consists of two main components (FIG. 9): 1) a layer-wise Tokens-to-Token module (T2T module 904) to model the local structure information of the image and reduce the length of tokens progressively: 2) an efficient T2T-ViT backbone 906 to draw the global attention relation on tokens from the T2T module.

Figure 9:
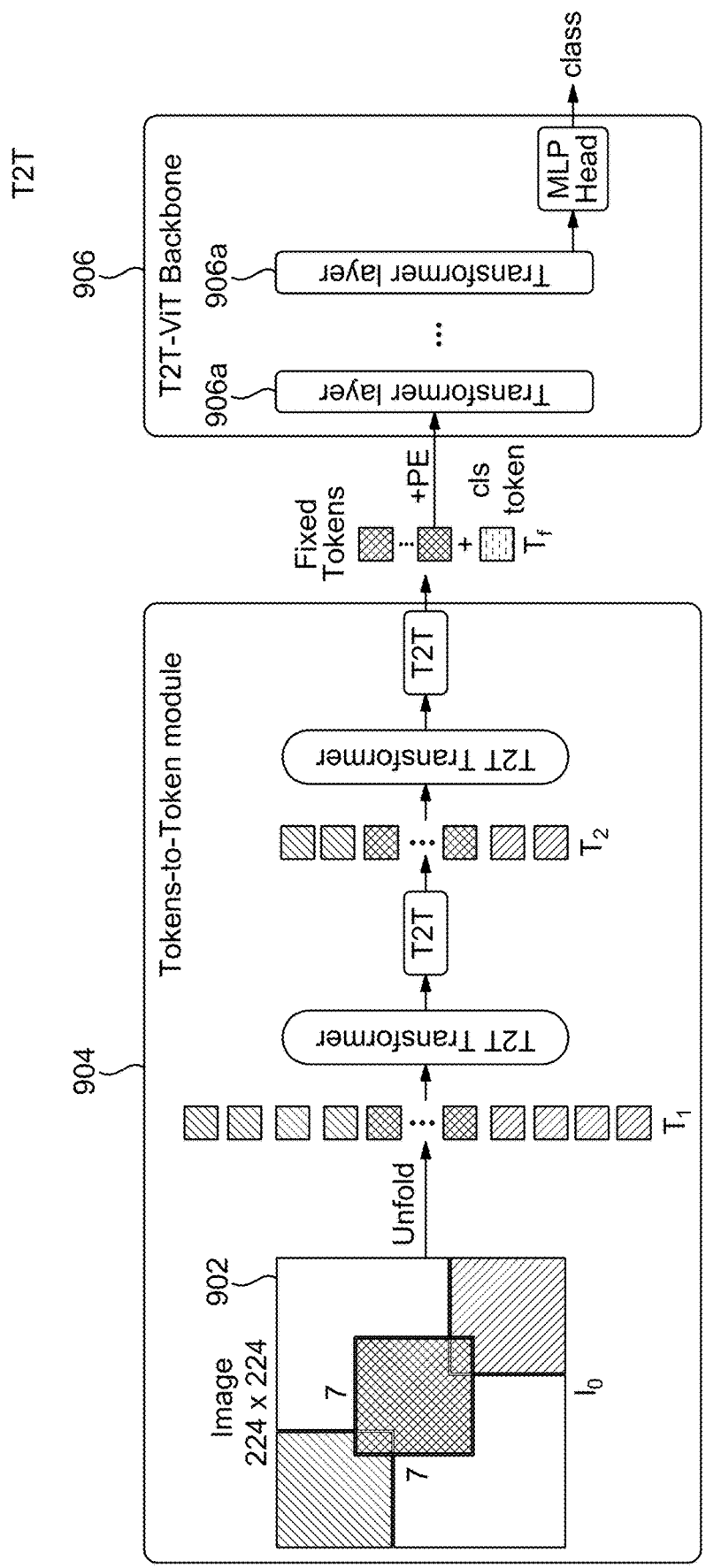
FIG. 9 is a block diagram of an architecture of the T2T-ViT backbone.

FIG. 9 is a block diagram of the overall network architecture of T2T-ViT. In the T2T module 904, the input image 902 is first soft split as patches, and then unfolded as a sequence of tokens T0. The length of tokens is reduced progressively in the T2T module 904 (two iterations are used and output Tf). Then the T2T-ViT backbone 906 takes the fixed tokens as input and outputs the predictions. In the original T2T-ViT, a MLP head determines the predicted class.

In an embodiment, the transformer layers 906a of the T2T-ViT backbone 906 make up the intermediate blocks 510 of the SDVIT of FIG. 5A. The first intermediate block receives an input of the token from the T2T module.

Comparison with the State-of-the-Art

The present ERM-SDViT approach is compared to several (in particular, 17) existing state-of-the art algorithms for DG (see Table 1) listed in Domainbed suite. See Gulrajani et al. Specifically, including the following DG algorithms: Empirical Risk Minimization (ERM), Invariant Risk Minimization (IRM), Group Distributionally Robust Optimization (GroupDRO), Inter-domain Mixup (Mixup), Meta-Learning for Domain Generalization (MLDG), Deep CORrelation ALignment (CORAL), Maximum Mean Discrepancy (MMD), Domain Adversarial Neural Networks (DANN), Class-conditional DANN (CDANN), Marginal Transfer Learning (MTL), Style-Agnostic Networks (SagNet), Adaptive Risk Minimization (ARM), Variance Risk Extrapolation (VREx), Representation Self Challenging (RSC), Self-supervised contrastive regularization (SelfReg), meta-Domain Specific-Domain Invariant (mDSDI), and Stochastic Weight Averaging Densely (SWAD). See Gulrajani et al.; Arjovsky et al.; Sagawa, S., Koh, P. W., Hashimoto, T. B., Liang, P.: Distributionally robust neural networks for group shifts: On the importance of regularization for worst-case generalization. arXiv preprint arXiv: 1911.08731 (2019): Yan, S., Song, H., Li, N., Zou, L., Ren, L.: Improve unsupervised domain adaptation with mixup training. arXiv preprint arXiv:2001.00677 (2020); Li et al.; Sun, B., Saenko, K.: Deep coral: Correlation alignment for deep domain adaptation. In: European conference on computer vision, Springer (2016) 443-450; Li et al.; Ganin et al.; Li, Y., Tian, X., Gong, M., Liu, Y., Liu, T., Zhang, K., Tao, D.: Deep domain generalization via conditional invariant adversarial networks. In: Proceedings of the European Conference on Computer Vision (ECCV). (2018) 624-639; Blanchard, G., Deshmukh, A. A., Dogan, U., Lee, G., Scott, C.: Domain generalization by marginal transfer learning. arXiv preprint arXiv:1711.07910 (2017); Nam et al.; Zhang, M., Marklund, H., Dhawan, N., Gupta, A., Levine, S., Finn, C.: Adaptive risk minimization: Learning to adapt to domain shift. Advances in Neural Information Processing Systems 34 (2021); Krueger, D., Caballero, E., Jacobsen, J. H., Zhang, A., Binas, J., Zhang, D., Le Priol, R., Courville, A.: Out-of-distribution generalization via risk extrapolation (rex). In: International Conference on Machine Learning, PMLR (2021) 5815-5826; Huang et al.; Kim et al.; Bui et al.; and Cha et al., each incorporated herein by reference in their entirety.

TABLE 1

Comparison with the several (17) existing state-of-the-art DG methods on five different benchmarks, including PACS, VLCS, OfficeHome, TerraIncognita and DomainNet. Best results are in bold and the second best are underlined.

| Algorithm | Backbone | # of Params | VLCS | PACS | OfficeHome | TerraInc | DomainNet | Average |
|---|---|---|---|---|---|---|---|---|
| ERM | ResNet-50 | 23.5M | 77.5 ± 0.4 | 85.5 ± 0.2 | 66.5 ± 0.3 | 46.1 ± 1.8 | 40.9 ± 0.1 | 63.3 |
| IRM | ResNet-50 | 23.5M | 78.5 ± 0.5 | 83.5 ± 0.8 | 64.3 ± 2.2 | 47.6 ± 0.8 | 33.9 ± 2.8 | 61.5 |
| GroupDRO | ResNet-50 | 23.5M | 76.7 ± 0.6 | 84.4 ± 0.8 | 66.0 ± 0.7 | 43.2 ± 1.1 | 33.3 ± 0.2 | 60.7 |

TABLE 1-continued

Comparison with the several (17) existing state-of-the-art DG methods on five
different benchmarks, including PACS, VLCS, OfficeHome, TerraIncognita and
DomainNet. Best results are in bold and the second best are underlined.

| Algorithm | Backbone | # of Params | VLCS | PACS | OfficeHome | TerraInc | DomainNet | Average |
|---|---|---|---|---|---|---|---|---|
| Mixup | ResNet-50 | 23.5M | 77.4 ± 0.6 | 84.6 ± 0.6 | 68.1 ± 0.3 | 47.9 ± 0.8 | 39.2 ± 0.1 | 63.4 |
| MLDG | ResNet-50 | 23.5M | 77.2 ± 0.4 | 84.9 ± 1.0 | 66.8 ± 0.6 | 47.7 ± 0.9 | 41.2 ± 0.1 | 63.5 |
| CORAL | ResNet-50 | 23.5M | 78.8 ± 0.6 | 86.2 ± 0.3 | 68.7 ± 0.3 | 47.6 ± 1.0 | 41.5 ± 0.1 | 64.5 |
| MMD | ResNet-50 | 23.5M | 77.5 ± 0.9 | 84.6 ± 0.3 | 66.3 ± 0.1 | 42.2 ± 1.6 | 23.4 ± 9.5 | 58.8 |
| DANN | ResNet-50 | 23.5M | 78.6 ± 0.4 | 83.6 ± 0.4 | 65.9 ± 0.6 | 46.7 ± 0.5 | 38.3 ± 0.1 | 62.6 |
| CDANN | ResNet-50 | 23.5M | 77.5 ± 0.1 | 82.6 ± 0.9 | 65.8 ± 1.3 | 45.8 ± 1.6 | 38.3 ± 0.3 | 62.0 |
| MTL | ResNet-50 | 23.5M | 77.2 ± 0.4 | 84.6 ± 0.5 | 66.4 ± 0.5 | 45.6 ± 1.2 | 40.6 ± 0.1 | 62.8 |
| SagNet | ResNet-50 | 23.5M | 77.8 ± 0.5 | 86.3 ± 0.2 | 68.1 ± 0.1 | 48.6 ± 1.0 | 40.3 ± 0.1 | 64.2 |
| ARM | ResNet-50 | 23.5M | 77.6 ± 0.3 | 85.1 ± 0.4 | 64.8 ± 0.3 | 45.5 ± 0.3 | 35.5 ± 0.2 | 61.7 |
| VREx | ResNet-50 | 23.5M | 78.3 ± 0.2 | 84.9 ± 0.6 | 66.4 ± 0.6 | 46.4 ± 0.6 | 33.6 ± 2.9 | 61.9 |
| RSC | ResNet-50 | 23.5M | 77.1 ± 0.5 | 85.2 ± 0.9 | 65.5 ± 0.9 | 46.6 ± 1.0 | 38.9 ± 0.5 | 62.6 |
| SelfReg | ResNet-50 | 23.5M | 77.5 ± 0.0 | 86.5 ± 0.3 | 69.4 ± 0.2 | 51.0 ± 0.4 | 44.6 ± 0.1 | 65.8 |
| mDSDI | ResNet-50 | 23.5M | 79.0 ± 0.3 | 86.2 ± 0.2 | 69.2 ± 0.4 | 48.1 ± 1.4 | 42.8 ± 0.1 | 65.0 |
| SWAD | ResNet-50 | 23.5M | 79.1 ± 0.1 | 88.1 ± 0.1 | 70.6 ± 0.2 | 50.0 ± 0.3 | 46.5 ± 0.1 | 66.8 |
| ERM-ViT | DeiT-Small | 22M | 78.3 ± 0.5 | 84.9 ± 0.9 | 71.4 ± 0.1 | 43.4 ± 0.5 | 45.5 ± 0.0 | 64.7 |
| ERM-SDViT | DeiT-Small | 22M | 78.9 ± 0.4 | 86.3 ± 0.2 | 71.5 ± 0.2 | 44.3 ± 1.0 | 45.8 ± 0.0 | 65.4 |
| ERM-SDViT + T3A | DeiT-Small | 22M | 81.6 ± 0.1 | 86.7 ± 0.2 | 72.5 ± 0.3 | 449. ± 0.4 | 47.4 ± 0.1 | 66.6 |
| ERM-ViT | CvT-21 | 32M | 79.0 ± 0.3 | 86.9 ± 0.3 | 75.5 ± 0.0 | 48.7 ± 0.4 | 50.4 ± 0.1 | 68.1 |
| ERM-SDViT | CvT-21 | 32M | 79.2 ± 0.4 | 88.3 ± 0.2 | 75.6 ± 0.2 | 49.7 ± 1.4 | 50.4 ± 0.0 | 68.6 |
| ERM-SDViT + T3A | CvT-21 | 22M | 81.9 ± 0.4 | 88.9 ± 0.5 | 77.0 ± 0.2 | 51.4 ± 0.7 | 52.0 ± 0.0 | 70.2 |
| ERM-ViT | T2T-ViT-14 | 21.5M | 78.9 ± 0.3 | 86.8 ± 0.4 | 73.7 ± 0.2 | 48.1 ± 0.2 | 48.1 ± 0.1 | 67.1 |
| ERM-SDViT | T2T-ViT-14 | 21.5M | 79.5 ± 0.8 | 88.0 ± 0.7 | 74.2 ± 0.3 | 50.6 ± 0.8 | 48.2 ± 0.2 | 68.1 |
| ERM-SDViT + T3A | T2T-ViT-14 | 21.5M | 81.2 ± 0.3 | 87.8 ± 0.6 | 75.5 ± 0.2 | 50.5 ± 0.6 | 50.2 ± 0.1 | 69.0 |

See Gulrajani et al.; Arjovsky et al.; Sagawa et al.; Yan et al.; Li and Yang et al.; Sun et al.; Li and Pan et al.; Ganin et al.; Li and Tian et al.; Blanchard et al.; Nam et al.; Zhang et al.; Krueger et al.; Huang et al.; Kim et al.; Bui et al.; Cha et al.; Touvron et al.; Wu et al.; and Yuan et al.

VLCS and OfficeHome: In VLCS, the approach (ERM-SDViT) records the best classification accuracy of 79.5% with T2T-ViT-14 backbone outperforming the baseline (ERM-ViT) and DG SOTA algorithms. Similarly, in OfficeHome, the present method outperforms all other methods under all three ViT backbones. In particular, it displays the best accuracy of 75.6% with CvT-21 backbone.

PACS, DomainNet and TerraInc: In PACS the present approach delivers the top accuracy of 88.3% and in DomainNet it achieves an accuracy of 50.4% with CvT-21 backbone. In TerraIncognita, the present method achieves a competitive accuracy of 50.6% with T2T-ViT-14 backbone against the top performing method of SelfReg. See Kim et al. In the overall average accuracy over five datasets, the present method outperforms the existing state-of-the-art in DG with CvT-21 and T2T-ViT-14 backbones. Moreover, it provides notable gains over the baseline (ERM-ViT) under the three recent ViT backbone architectures.

Ablation Study and Analysis

In this section, ablation studies are reported and different analysis to understand the present approach. In all experiments, unless stated otherwise, the baseline method is ERM-ViT with DeiT-Small backbone. See Touvron et al.

With a recent DG baseline: It can be seen that the present approach is also effective in further improving the performance of a strong DG baseline namely T3A (see Table 1 and 2). See Iwasawa, Y., Matsuo, Y.: Test-time classifier adjustment module for model-agnostic domain generalization. Advances in Neural Information Processing Systems 34 (2021), incorporated herein by reference in its entirety. T3A computes a pseudo-prototype representation for each class using unlabeled data augmented by the base classifier trained in the source domains in an online manner. A test image is classified based on its distance to the pseudo-prototype representation. The present approach with T3A (ERM-SDViT+T3A) consistently improves the performance of the baseline (ERM-ViT+T3A) with all three VIT backbones.

TABLE 2

The present approach is also effective in further improving the performance
of a strong DG baseline namely T3A. Results are reported with different
ERM-ViT backbone architectures: DeiT-Small, CvT-21, and T2T-ViT-14.

| Model | Backbone | # of Params | Art | Cartoons | Photos | Sketches | Average |
|---|---|---|---|---|---|---|---|
| ERM | ResNet-50 | 23.5M | 81.3 ± 0.6 | 80.9 ± 0.3 | 96.3 ± 0.6 | 78.0 ± 1.6 | 84.1 ± 0.4 |
| ERM-ViT | DeiT-Small | 22M | 87.4 ± 1.2 | 81.5 ± 0.8 | 98.1 ± 0.1 | 72.6 ± 3.3 | 84.9 ± 0.9 |
| ERM-ViT + T3A | DeiT-Small | 22M | 88.1 ± 1.5 | 81.8 ± 0.8 | 98.3 ± 0.1 | 73.8 ± 2.7 | 85.5 ± 0.7 |
| ERM-SDViT | DeiT-Small | 22M | 87.6 ± 0.3 | 82.4 ± 0.4 | 98.0 ± 0.3 | 77.2 ± 1.0 | 86.3 ± 0.2 |
| ERM-SDViT + T3A | DeiT-Small | 22M | 88.2 ± 0.4 | 82.9 ± 0.5 | 98.3 ± 0.1 | 77.2 ± 0.9 | 86.7 ± 0.2 |
| ERM-ViT | CvT-21 | 32M | 89.0 ± 1.0 | 84.8 ± 0.6 | 98.8 ± 0.2 | 78.6 ± 0.3 | 87.8 ± 0.1 |
| ERM-ViT + T3A | CvT-21 | 32M | 90.1 ± 0.7 | 85.3 ± 0.6 | 99.01 ± 0.1 | 79.6 ± 0.4 | 88.5 ± 0.1 |
| ERM-SDViT | CvT-21 | 32M | 90.8 ± 0.1 | 84.1 ± 0.5 | 98.3 ± 0.2 | 80.0 ± 1.3 | 88.3 ± 0.2 |

TABLE 2-continued

The present approach is also effective in further improving the performance of a strong DG baseline namely T3A. Results are reported with different ERM-ViT backbone architectures: DeiT-Small, CvT-21, and T2T-ViT-14.

| Model | Backbone | # of Params | Art | Cartoons | Photos | Sketches | Average |
|---|---|---|---|---|---|---|---|
| ERM-SDViT + T3A | CvT-21 | 32M | 91.2 ± 0.8 | 83.5 ± 0.2 | 98.2 ± 0.1 | 82.5 ± 1.5 | 88.9 ± 0.5 |
| ERM-ViT | T2T-ViT-14 | 21.5M | 89.6 ± 0.9 | 81.0 ± 0.9 | 98.9 ± 0.2 | 77.6 ± 2.6 | 86.8 ± 0.4 |
| ERM-ViT + T3A | T2T-ViT-14 | 21.5M | 90.7 ± 1.0 | 82.4 ± 0.6 | 99.1 ± 0.1 | 78.5 ± 2.2 | 87.7 ± 0.4 |
| ERM-SDViT | T2T-ViT-14 | 21.5M | 90.2 ± 1.2 | 82.7 ± 0.7 | 98.6 ± 0.2 | 80.5 ± 2.2 | 88.0 ± 0.7 |
| ERM-SDViT + T3A | T2T-ViT-14 | 21.5M | 89.2 ± 1.8 | 84.0 ± 0.1 | 98.7 ± 0.1 | 79.3 ± 1.1 | 87.8 ± 0.6 |

See Iwasawa et al.

Figure 10A:
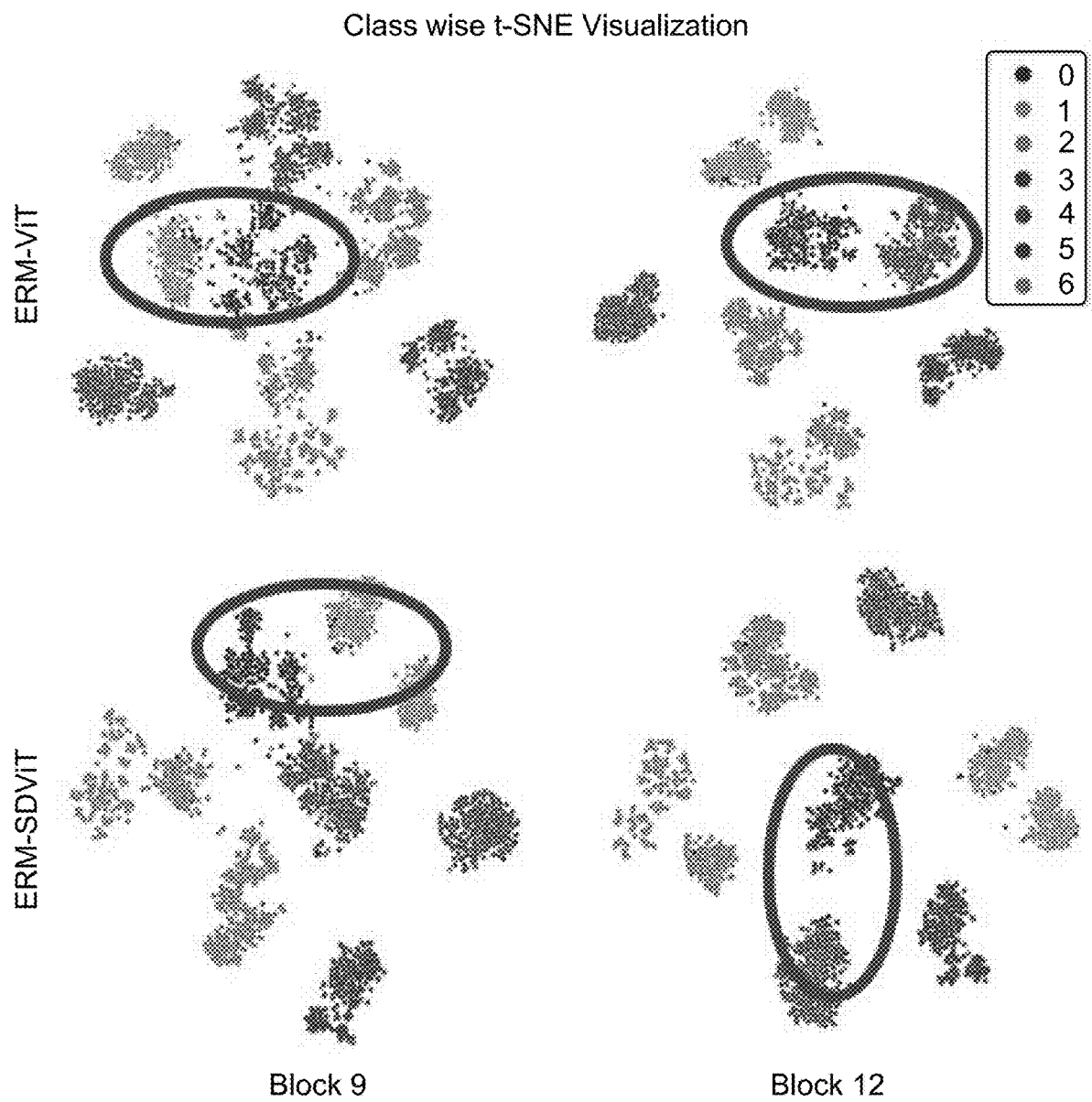
FIG. 10A illustrates t-SNE visualization of the class-wise feature representations of different blocks in ERM-ViT and ERM-SDViT.

Feature visualizations: FIG. 10A visualizes the class-wise feature representations of different blocks using t-SNE in baseline and the present approach. t-SNE (t-Distributed Stochastic Neighbor Embedding) is a very powerful machine learning algorithm that can be used to visualize a high-dimensional dataset also in two-dimensional figures.

Figure 10B:
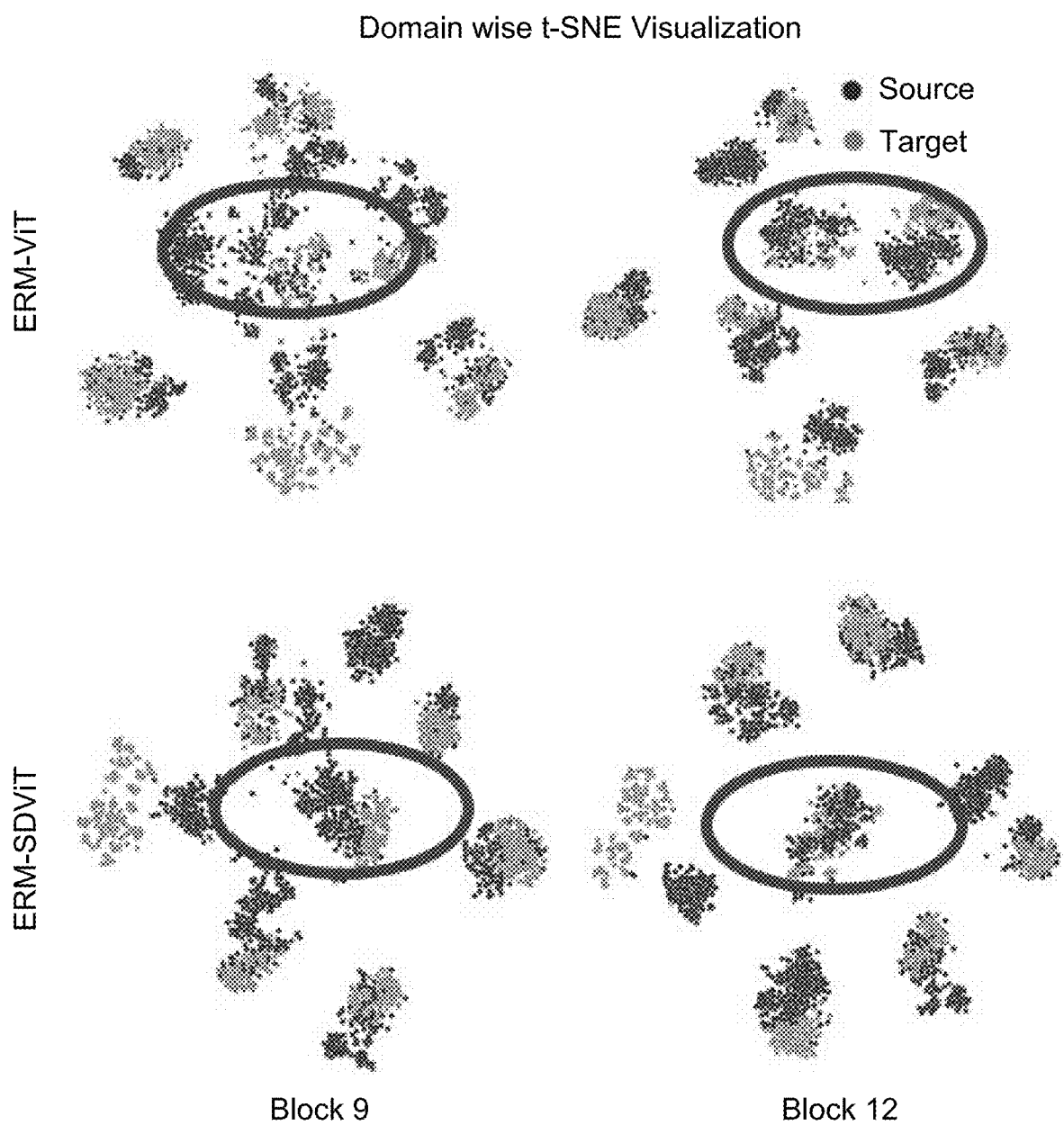
FIG. 10B illustrates the same features as FIG. 10A, however, they are arranged based on their domain labels.

In particular, FIG. 10A illustrates t-SNE visualization of features from different blocks (9 & 12) in baseline and the present approach. Features are identified corresponding to their class labels (classes: 7, PACS dataset). In FIG. 10B, features are identified corresponding to their domain labels. The present approach performed well for instance, in class wise t-SNE in block 9, the features of class 0 and 1 (highlighted in one circle) are well separated as compared to ERM-ViT baseline. Similarly in class 0 and 4 in the final 12th block features of the ERM-SDViT approach are also separated clearly. While in domain-wise t-SNE, similar pattern is observed, as source and target domain features are more overlapped with each other and clearly separated as well.

Compared to baseline, the present approach facilitates learning more discriminative features. As a result, the intra-class features are compactly clustered while the inter-class features are far apart.

On different block selection techniques, it can be seen that the impact on performance with different ways of selecting blocks in the self-distillation method (see Table 3). First, we restrict the random sampling of blocks to earlier blocks i.e. from block 0 to block 5. Second, the random sampling of blocks limit to later blocks i.e. from block 6 to block 11. Finally, the present method does not perform any sampling in any range and rather include all the blocks. See Zhang et al. Compared to all aforementioned block selection techniques, random sampling from the full range of blocks shows the best (overall) average accuracy of 86.3%. Sampling from earlier blocks seems beneficial as compared to the later blocks. When earlier blocks, with relatively longer feature pathways to the final block, are provided with soft target labels, there is potentially greater room for exploring cross-domain generalizable features.

TABLE 3

Impact on performance with different ways of selecting transformer blocks in the self-distillation method.

| Model | Art | Cartoons | Photos | Sketches | Average |
|---|---|---|---|---|---|
| ERM-ViT | 87.4 ± 1.2 | 81.5 ± 0.8 | 98.1 ± 0.1 | 72.6 ± 3.3 | 84.9 ± 0.9 |
| ERM-SDViT[0-5] | 87.3 ± 0.2 | 82.1 ± 0.4 | 98.3 ± 0.1 | 76.6 ± 2.1 | 86.1 ± 0.5 |
| ERM-SDViT[6-11] | 86.8 ± 0.8 | 81.4 ± 0.3 | 98.6 ± 0.1 | 74.3 ± 1.7 | 85.3 ± 0.3 |
| ERM-ViT[self.dist all blocks] | 87.8 ± 1.9 | 82.2 ± 0.7 | 97.9 ± 0.1 | 75.0 ± 1.1 | 85.7 ± 0.3 |
| ERM-SDViT[0-11] | 87.6 ± 0.3 | 82.4 ± 0.4 | 98.0 ± 0.3 | 77.2 ± 1.0 | 86.3 ± 0.2 |

Figure 11:
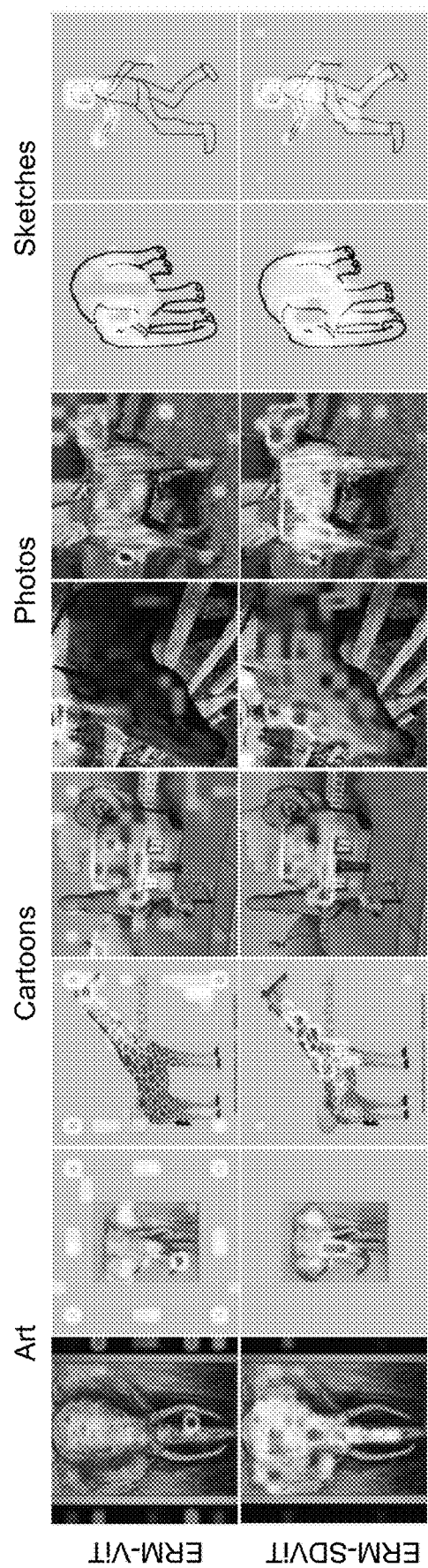
FIG. 11 illustrates a comparison of attention maps between ERM-ViT and ERM-SDViT using the DeiT backbone on four target domains of PACS dataset.

What kind of features the present DG approach facilitates?: FIG. 11 visualizes the features that are used by the baseline and the present method to make predictions through visualizing attention maps. FIG. 11 illustrates a comparison of attention maps between the baseline ERM-ViT and the present ERM-SDViT (backbone: DeiT-Small) on four target domains of PACS dataset. Note that the attention maps are computed at the final block of ViT models. In all target domains, it is observed that the present method mostly attends to features that mainly capture the semantics and the shape of the object class. On the contrary, the baseline has a greater tendency to attend background features and thus focus less on the object class features. The present self-distillation approach encourages the intermediate blocks to bank on more robust and generalizable features via providing supervision with a soft non-zero entropy signal, thereby reducing the overfitting of the model to the source domains.

Figure 12:
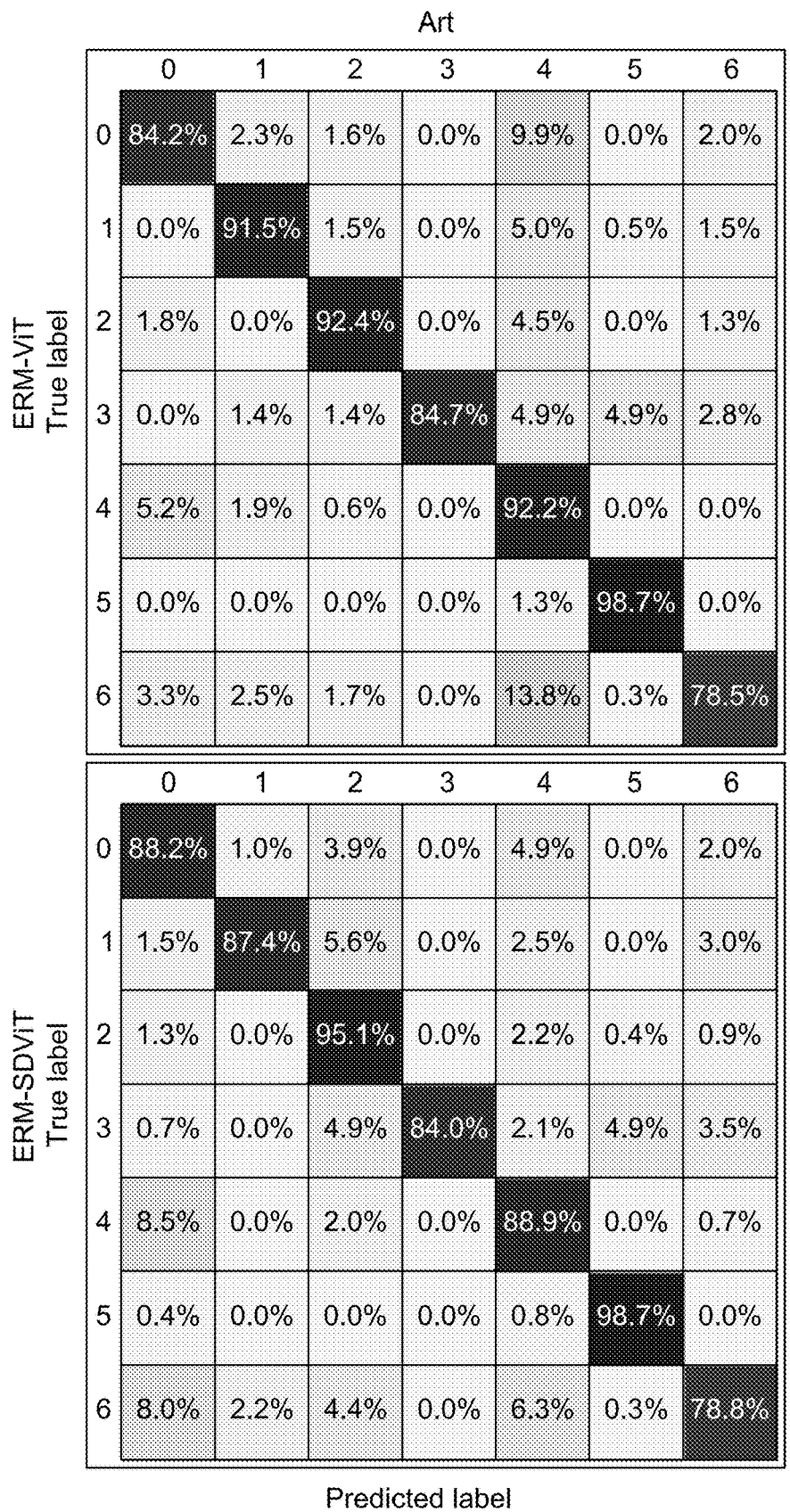
FIG. 12 are confusion matrices of the ERM-ViT and ERM-SDViT on the PACS dataset.
Figure 12:
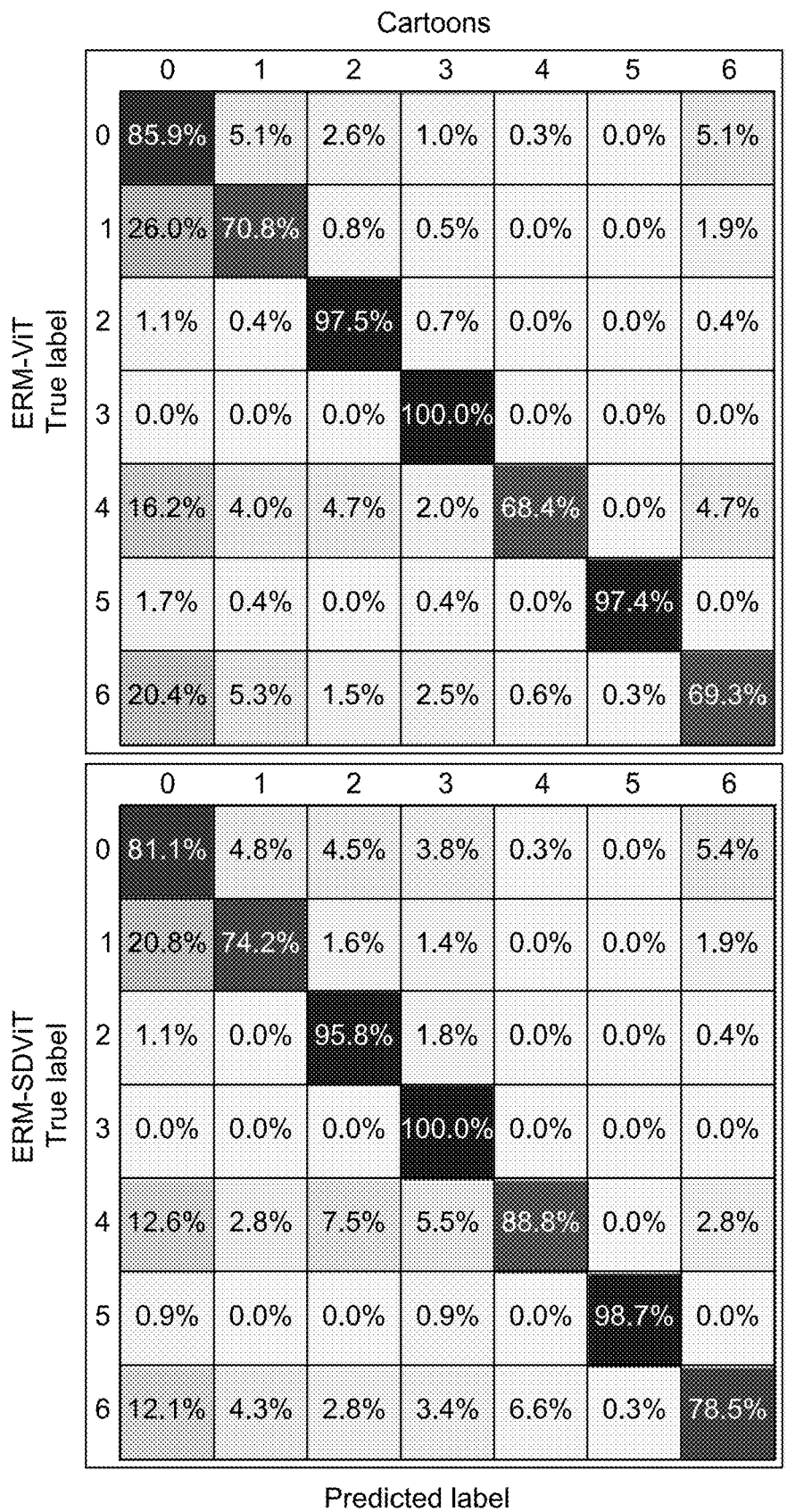
Figure 12:
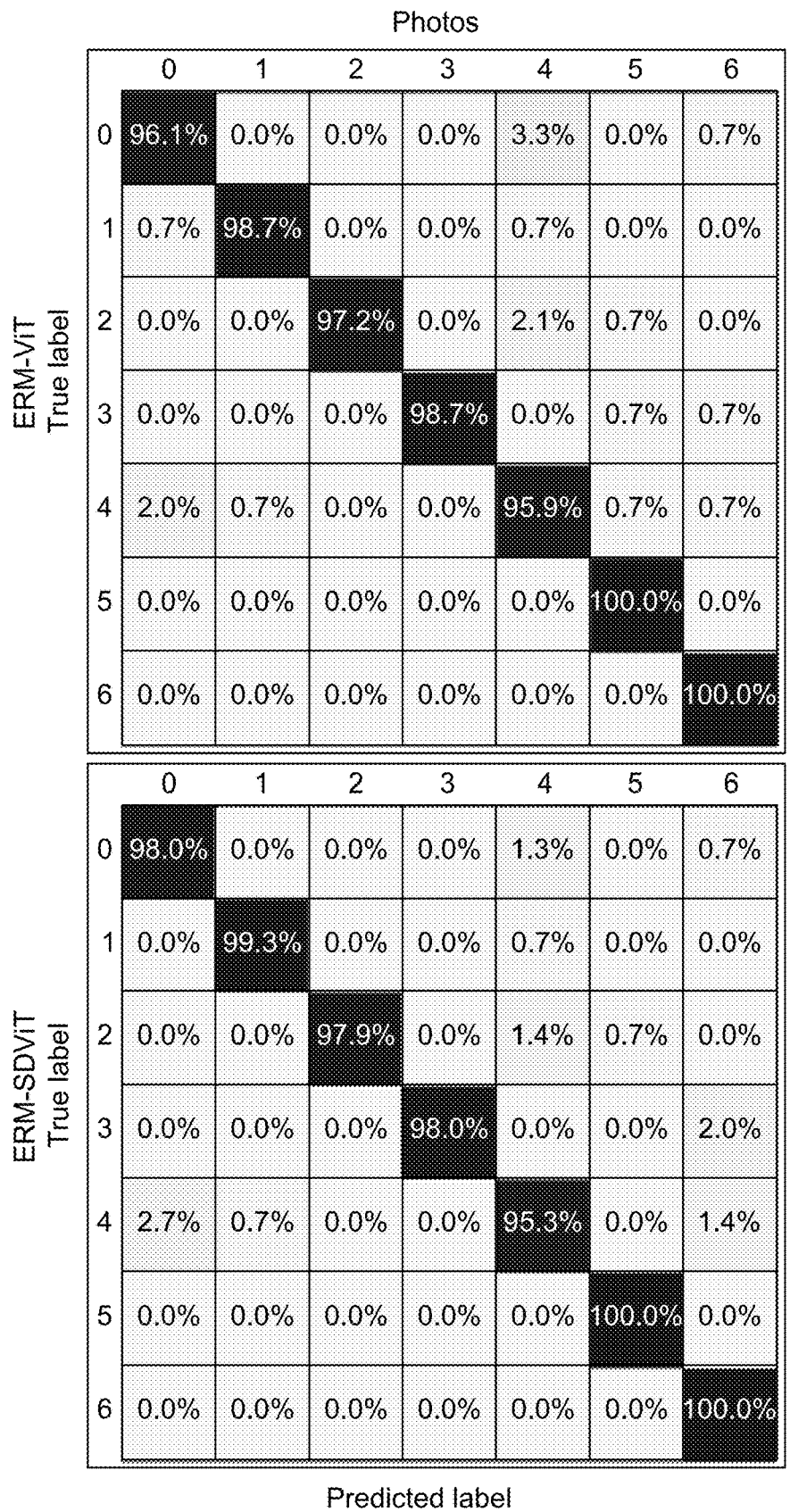
Figure 12:
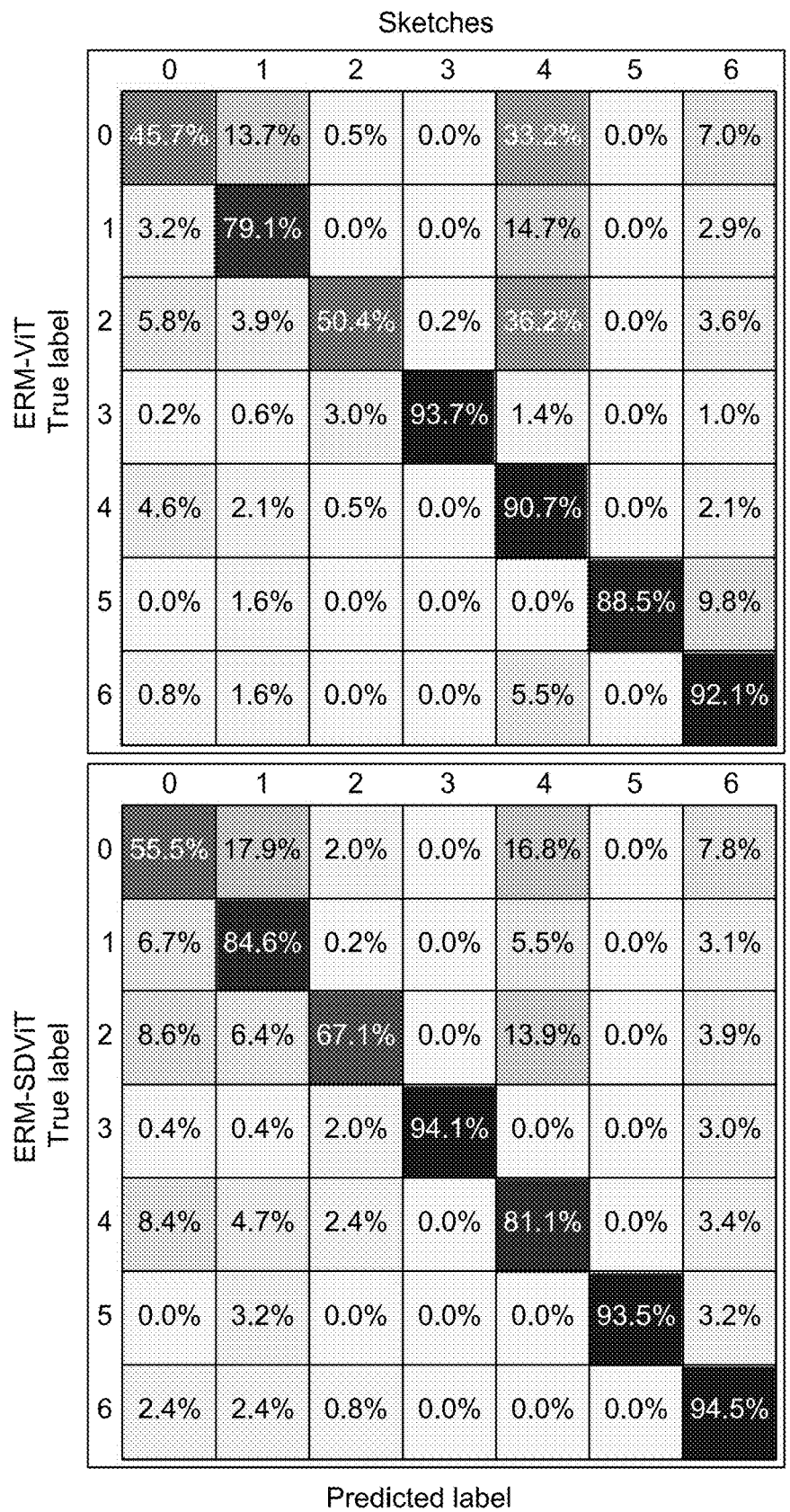

Confusion matrices: FIG. 12 visualizes the confusion matrices for the baseline and the present method on PACS dataset. The classes in the Figure are '0':Dog, '1': Elephant, '2':Giraffe, '3': Guitar, '4': Horse, '5':House, and '6': Person.

Compared to baseline, the present method produces less number of false positives, particularly in 'Sketches' as target domain.

Training overhead: Table 4 reports training overhead, computed as relative % increase in training time (hrs.), introduced by the present method on top of the baseline. The present method adds very little training overhead over the baseline.

TABLE 4

Training overhead, computed as relative % increase in training time (hrs.), introduced by the present method on top of the baseline.

| Model | Art | Cartoons | Photos | Sketches |
|---|---|---|---|---|
| ERM-ViT | 0.266 | 0.270 | 0.278 | 0.267 |
| ERM-SDViT | 0.279 | 0.276 | 0.279 | 0.278 |
| Rel.overhead | 4.88 | 2.22 | 0.35 | 4.11 |

Performance under different domain shifts: The performance is benchmarked under various types of domain shifts, including background shifts, corruption shifts, texture shifts, and style shifts. For instance, background shifts do not affect pixel, shape, texture and structures in foreground object. Whereas style shifts typically depict variance at different stages of concepts, including texture, shape and object part. See Zhang et al. (2021). To this end, five DG datasets include PACS, VLCS, OfficeHome, TerraIncognita, and DomainNet, are classified into four different domain shift categories based on the type of shift(s) exhibited by them. Table 5 reports the results by ERM-ViT (baseline) and ERM-SDViT under four different kinds of domain shifts. It can be observed that ERM-SDViT outperforms ERM-ViT across the whole spectrum of domain shifts. It shows that the present self-distillation strategy allows the learning of cross-domain generalizable features that are effective under the full spectrum of domain shifts.

TABLE 5

Performance under various types of domain shifts. We categorize five DG datasets, including PACS, VLCS, OfficeHome (OH), TerraIncognita (Terra), and DomainNet, into these four different domain shift categories based on the type of shift(s) exhibited by them. Each entry in the Table is the accuracy (%) averaged over the datasets belonging to a certain domain shift category.

| | Shift Type | | | |
|---|---|---|---|---|
| Methods | Background Shifts (VLCS, Terra) | Corruption Shifts (Terra) | Texture Shifts (PACS, DomainNet) | Style Shifts (OH, PACS, DomainNet) |
| ERM-ViT | 60.0 | 43.4 | 65.2 | 67.2 |
| ERM-SDViT | 61.6 | 44.3 | 66.0 | 67.8 |

Figure 13A:
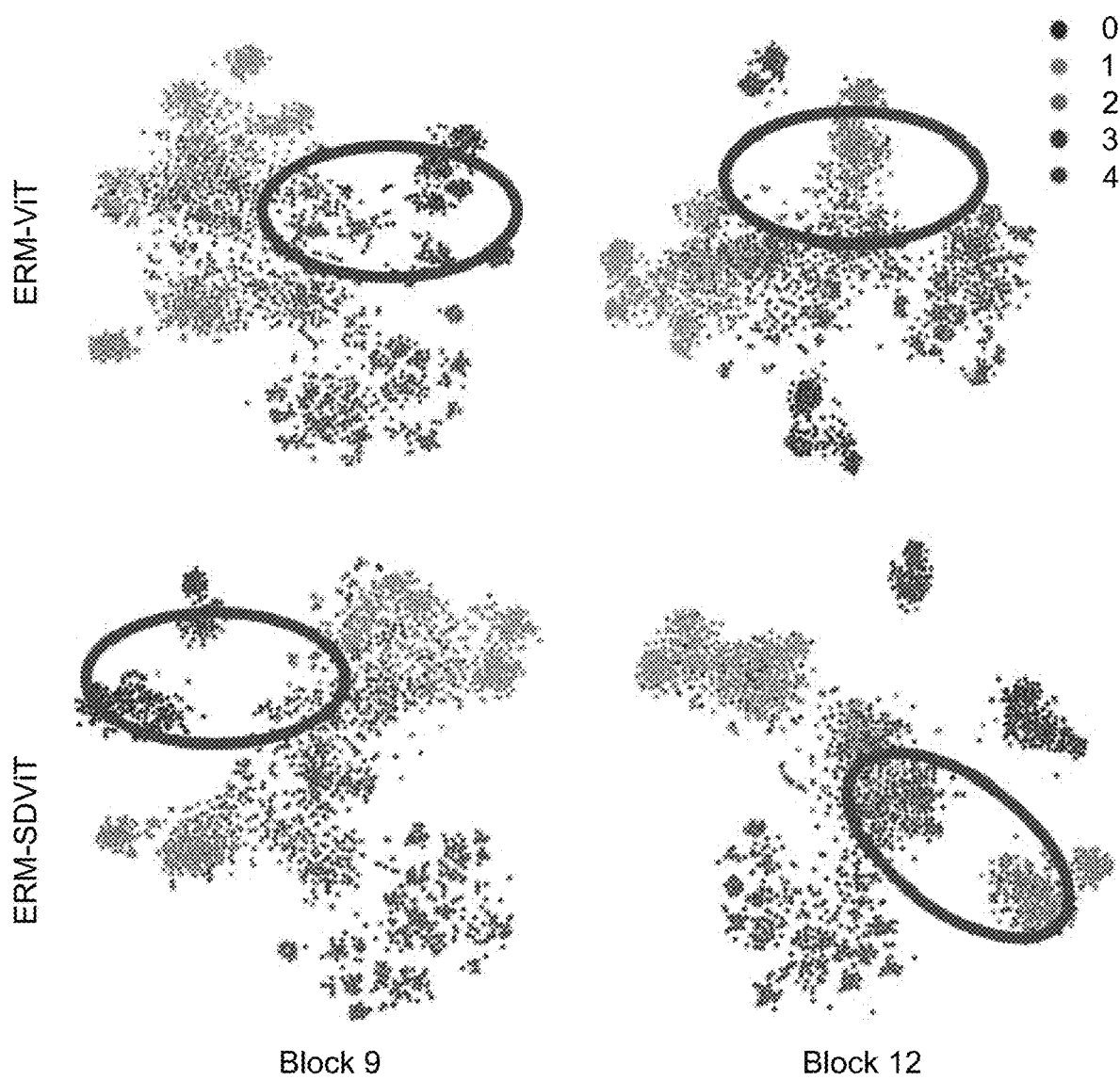
FIG. 13A illustrates the class-wise feature representations of different blocks using t-SNE in ERM-ViT and ERM-SDViT for Caltech101 target domain in the VLCS dataset.
Figure 13B:
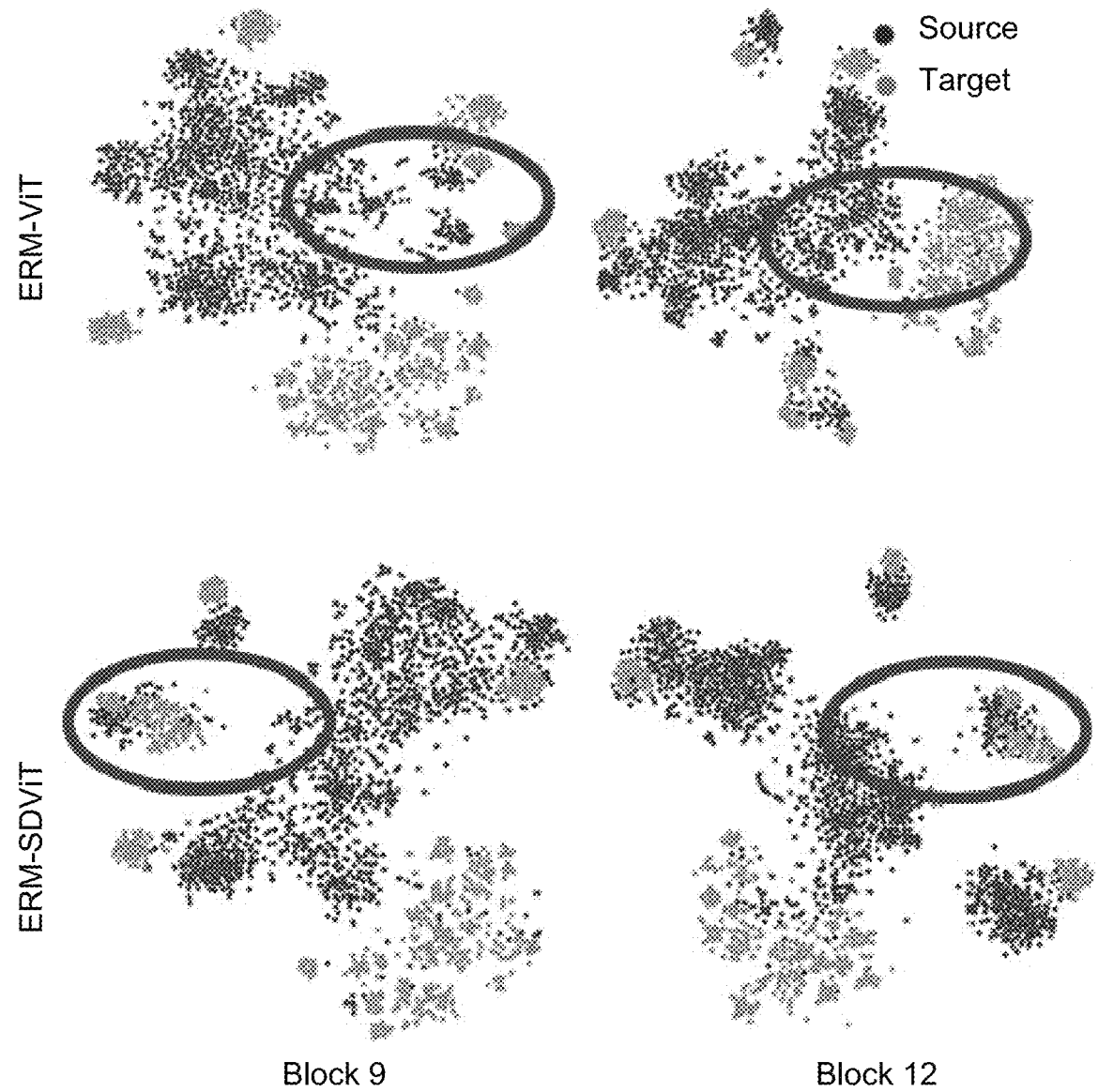
FIG. 13B illustrates the same features, but on the basis of source and target domain labels.

More t-SNE feature visualizations: FIG. 13A visualizes the class-wise feature representations of different blocks using t-SNE in baseline (ERM-ViT) and the present model (ERM-SDViT) for Caltech 101 target domain in the VLCS dataset. In particular, FIG. 13A illustrates t-SNE visualization of features from different blocks (9 & 12) in baseline (ERMViT) and the present approach for Caltech 101 target domain in VLCS dataset. Features are identified corresponding to their class labels (classes: 5). In FIG. 13B features are colored corresponding to their domain labels. The present approach (ERM-SDViT) improves class-wise discrimination. For instance, in class-wise t-SNE in block 9, the features of class 0 and 3 (highlighted in one circle) are well-separated as compared to the baseline (ERM-ViT). Similarly, in block 12, the features of class 2 and 4 are clearly distinguishable. In domain-wise t-SNE, for the present approach, source and target domain features show greater overlap with each other.

In comparison to baseline, the present method facilitates improved learning of discriminative features and hence reduces the intra-class variance while increasing the inter-class variance in the feature space. Similarly, FIG. 13B visualizes the same features, however, on the basis of source and target domain labels. Compared to baseline, the present method promotes a greater overlap between the features of source and target domain features.

Figure 14:
FIG. 14 are confusion matrices of the ERM-ViT and ERM-SDViT on the VLCS dataset.
Figure 14:
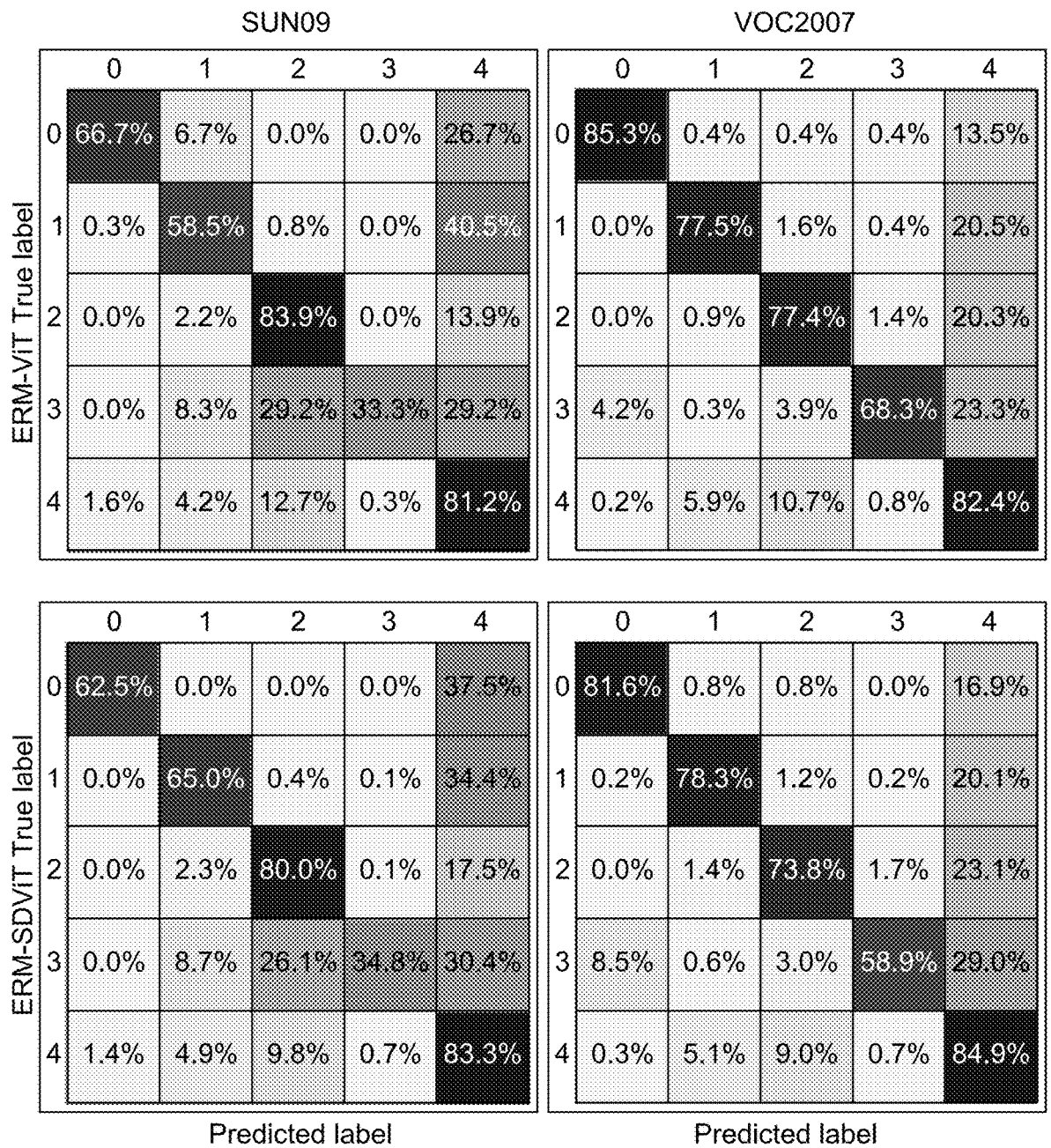

Confusion matrices on other DG dataset: FIG. 14 visualizes the confusion matrices for the baseline and the present method on VLCS dataset. The classes in the figure are '0': Bird, '1':Car, '2':Chair, '3': Dog, and '4': Person. In comparison to baseline, the present method is capable of reducing false positives in all four target domains.

Figure 15:
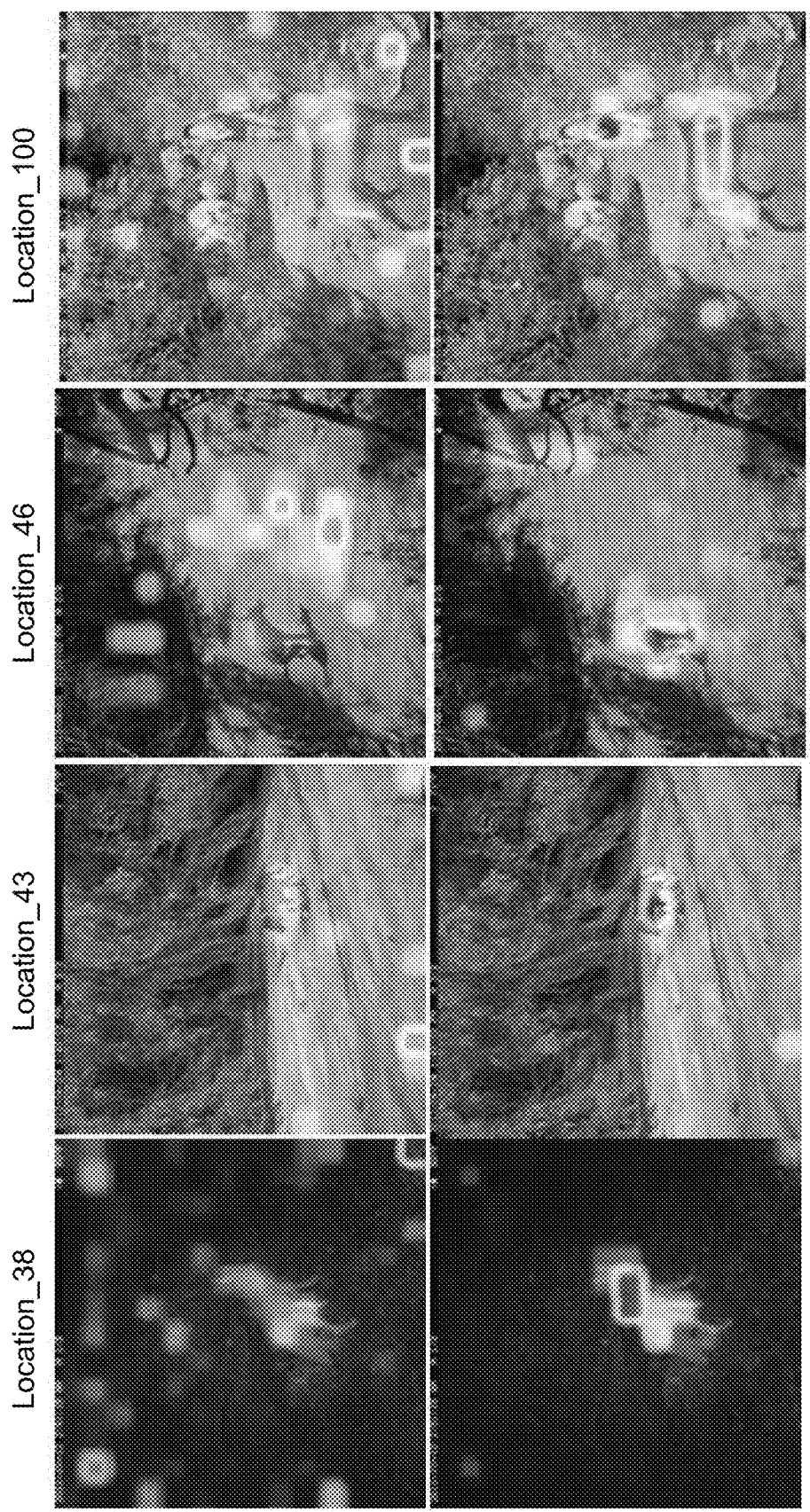
FIG. 15 illustrates a comparison of attention maps between ERM-ViT and ERM-SDViT using the DeiT backbone on four target domains of TerraIncognita dataset.
Figure 16:
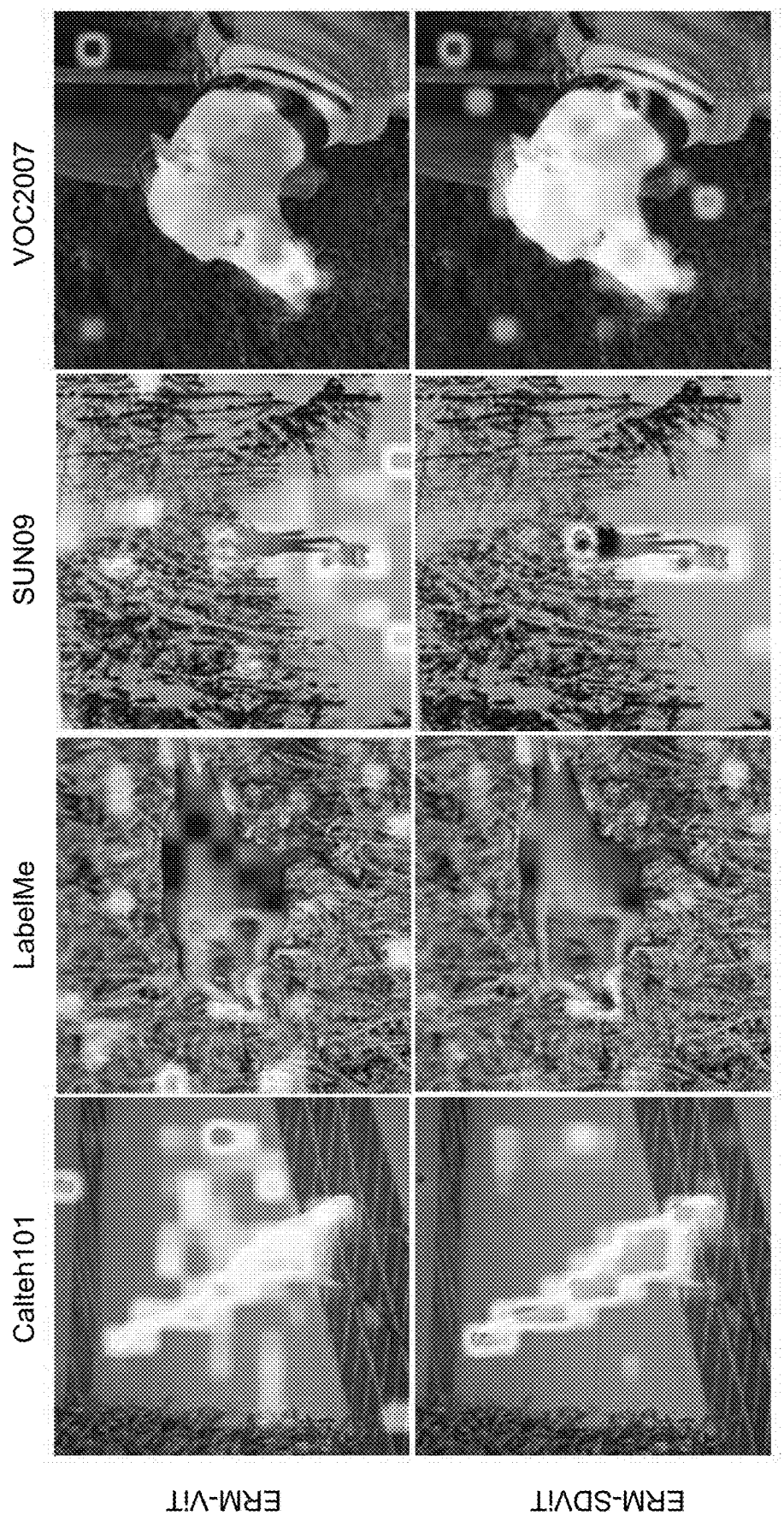
FIG. 16 illustrates a comparison of attention maps between ERM-ViT and ERM-SDViT using the DeiT backbone on four target domains of VLCS dataset.
Figure 17:
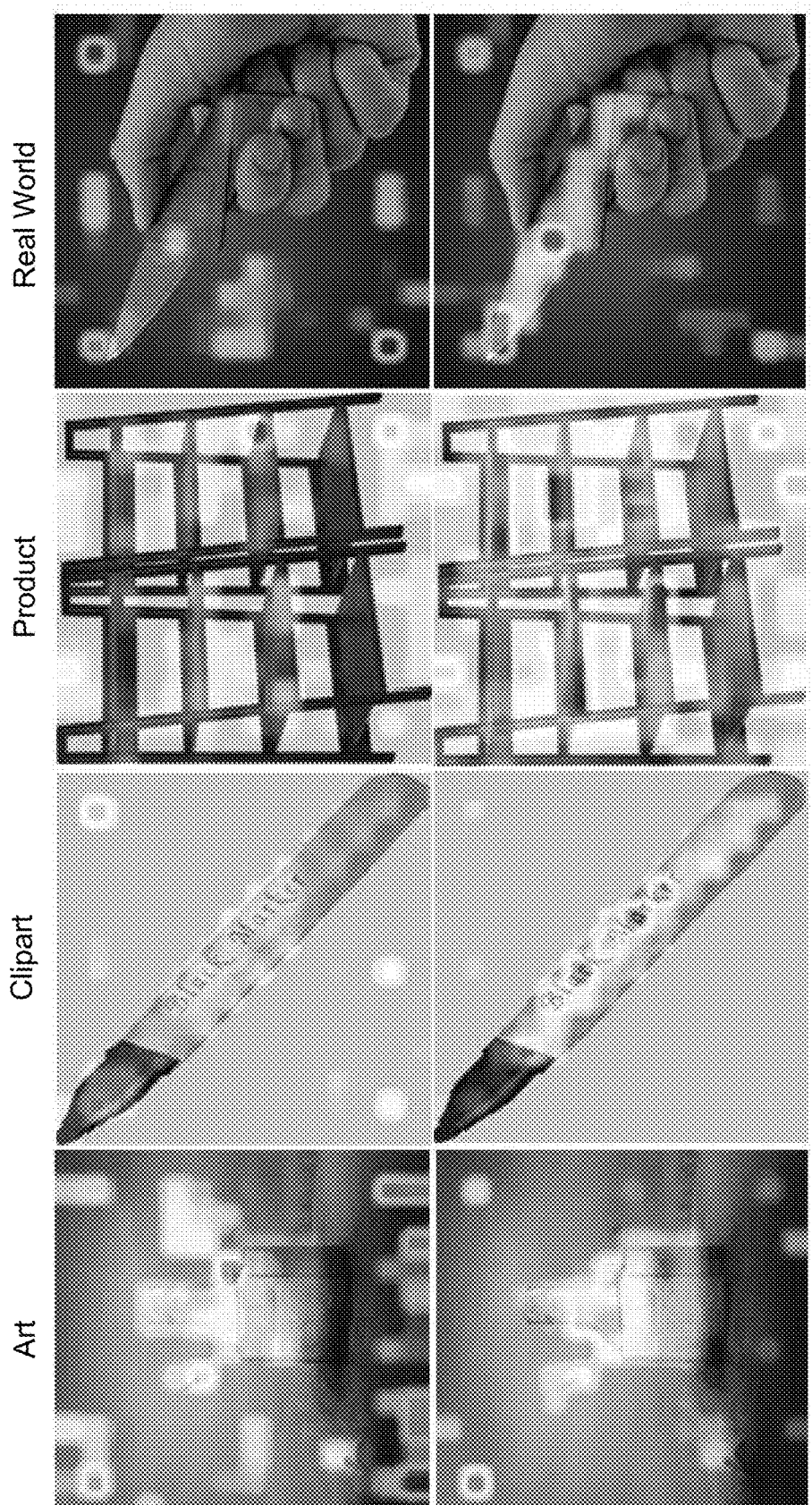
FIG. 17 illustrates a comparison of attention maps between ERM-ViT and ERM-SDViT using the DeiT backbone on four target domains of OfficeHome dataset.

Attention visualizations on other DG datasets: Also, attention maps are visualized from different images of four datasets, including VLCS, OfficeHome, TerraIncognita and DomainNet in FIGS. 15, 16, 17, and 18. FIG. 15 illustrates attention maps for comparison between the baseline (ERM-ViT) and the present method (ERM-SDViT) on four target domains of TerraIncognita dataset. FIG. 16 illustrates attention maps for comparison between the baseline (ERM-ViT) and the present method (ERM-SDViT) on four target domains of VLCS dataset. FIG. 17 illustrates attention maps for comparison between the baseline (ERM-ViT) and the present method (ERM-SDViT) on four target domains of OfficeHome dataset.

Figure 18:
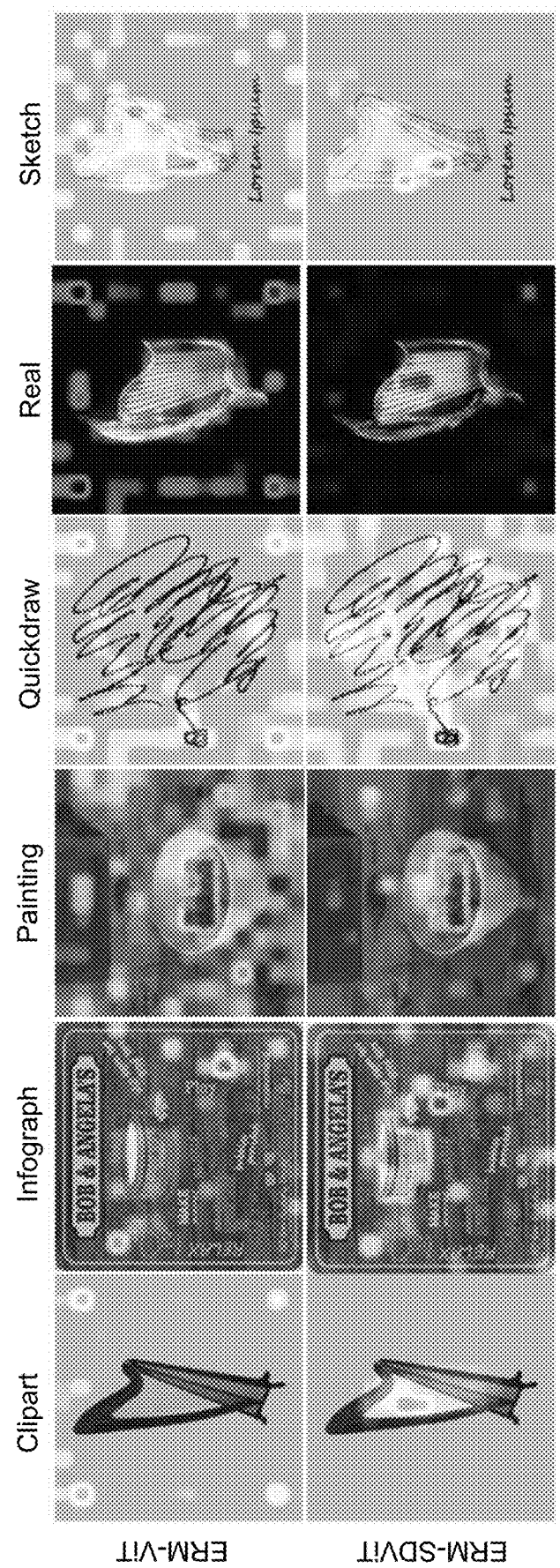
FIG. 18 illustrates a comparison of attention maps between ERM-ViT and ERM-SDViT using the DeiT backbone on six target domains of DomainNet datasets.

FIG. 18 illustrates attention maps for comparison between the baseline (ERM-ViT) and the present method (ERM-SDViT) on six target domains of DomainNet datasets. The ViT backbone for all datasets is DeiT-Small.

It can be observed that in all target domains of the four datasets, the present method mostly relies on features corresponding to the foreground object's semantics rather than the background information. However, the baseline approach (ERM-ViT) mostly capitalizes more on the background features and pays less attention to the features belonging to foreground object. For instance, in FIG. 15, target domain: Location_46 of the TerraIncognita dataset, the present method is capable of focusing on the foreground object (a dog), which occupies a small fraction of the overall image. However, the baseline model is prone to attending more to the background features, which are prevalent in the image. Note that the attention maps are computed at the final block of ViT models.

Recognition accuracy on target domains of other DG datasets: Tables 6 and 7 compares target domain-wise recognition accuracy on VLCS, OfficeHome, TerraIncognita, and DomainNet datasets of the present method with the baseline utilizing three ViT backbones and a DG baseline (T3A). See Iwasawa et al.

TABLE 6

Comparison of target domain-wise classification accuracy on VLCS, OfficeHome, and TerraIncognita datasets. Results are reported of the present method with the baseline using three different ViT backbones, including DeiT-Small, CvT-21, and T2T-ViT-14, and a DG baseline (T3A).

| | | | VLCS | | | | |
|---|---|---|---|---|---|---|---|
| Dataset Model | Backbone | # of Params | Caltech101 | LableMe | SUN09 | VOC2007 | Average |
| ERM | ResNet-50 | 23.5M | 98.1 ± 0.4 | 64.1 ± 0.5 | 70.7 ± 0.9 | 74.8 ± 2.4 | 76.9 ± 0.6 |
| ERM-ViT | DeiT-Small | 22M | 96.7 ± 0.8 | 65.2 ± 1.0 | 73.9 ± 0.3 | 77.4 ± 0.3 | 78.3 ± 0.5 |
| ERM-SDViT | DeiT-Small | 22M | 96.8 ± 0.5 | 64.2 ± 0.8 | 76.2 ± 0.4 | 78.5 ± 0.4 | 78.9 ± 0.4 |
| ERM-SDViT + T3A | DeiT-Small | 22M | 98.9 ± 0.2 | 65.9 ± 0.3 | 79.8 ± 0.4 | 81.9 ± 0.4 | 81.6 ± 0.1 |
| ERM-ViT | CvT-21 | 32M | 97.3 ± 0.5 | 65.2 ± 0.9 | 76.6 ± 1.1 | 76.9 ± 0.3 | 79.0 ± 0.3 |
| ERM-SDVit | CvT-21 | 32M | 96.5 ± 0.7 | 63.3 ± 0.4 | 78.1 ± 0.2 | 78.9 ± 0.8 | 79.2 ± 0.4 |
| ERM-ViT + T3A | CvT-21 | 32M | 98.4 ± 0.3 | 66.8 ± 0.5 | 80.1 ± 1.0 | 80.6 ± 0.7 | 81.9 ± 0.4 |
| ERM-ViT | T2T-ViT-14 | 21.5M | 96.5 ± 0.5 | 64.5 ± 0.1 | 76.4 ± 0.4 | 78.2 ± 1.0 | 78.9 ± 0.3 |
| ERM-SDVit | T2T-ViT-14 | 21.5M | 96.9 ± 0.4 | 64.0 ± 0.5 | 76.7 ± 1.4 | 80.4 ± 1.3 | 79.5 ± 0.8 |
| ERM-SDViT + T3A | T2T-ViT-14 | 21.5M | 98.6 ± 0.3 | 66.5 ± 0.7 | 78.2 ± 0.5 | 81.7 ± 0.9 | 81.2 ± 0.3 |

| | | | OfficeHome | | | | |
|---|---|---|---|---|---|---|---|
| Dataset Model | Backbone | # of Params | Art | Clipart | Product | Real World | Average |
| ERM | ResNet-50 | 23.5M | 58.8 ± 1.0 | 51.3 ± 0.4 | 73.7 ± 0.4 | 74.7 ± 0.6 | 64.6 ± 0.2 |
| ERM-ViT | DeiT-Small | 22M | 67.6 ± 0.3 | 57.0 ± 0.6 | 79.4 ± 0.1 | 81.6 ± 0.4 | 71.4 ± 0.1 |
| ERM-SDViT | DeiT-Small | 22M | 68.3 ± 0.8 | 56.3 ± 0.2 | 79.5 ± 0.3 | 81.8 ± 0.1 | 71.5 ± 0.2 |
| ERM-SDViT + T3A | DeiT-Small | 22M | 69.1 ± 1.0 | 57.9 ± 0.4 | 80.7 ± 0.0 | 82.3 ± 0.1 | 72.5 ± 0.3 |
| ERM-ViT | CvT-21 | 32M | 74.4 ± 0.2 | 59.8 ± 0.5 | 83.5 ± 0.4 | 84.1 ± 0.2 | 75.5 ± 0.0 |
| ERM-SDVit | CvT-21 | 32M | 73.8 ± 0.6 | 60.7 ± 0.9 | 83.0 ± 0.3 | 85.0 ± 0.3 | 75.6 ± 0.2 |
| ERM-ViT + T3A | CvT-21 | 32M | 75.2 ± 0.7 | 62.7 ± 0.8 | 84.2 ± 0.6 | 86.1 ± 0.0 | 77.0 ± 0.2 |
| ERM-ViT | T2T-ViT-14 | 21.5M | 70.2 ± 0.5 | 59.0 ± 0.6 | 81.9 ± 0.3 | 83.6 ± 0.6 | 73.7 ± 0.2 |
| ERM-SDVit | T2T-ViT-14 | 21.5M | 71.1 ± 0.5 | 59.2 ± 0.3 | 82.8 ± 0.4 | 83.5 ± 0.3 | 74.2 ± 0.3 |
| ERM-SDViT + T3A | T2T-ViT-14 | 21.5M | 70.8 ± 0.4 | 61.9 ± 0.7 | 84.1 ± 0.2 | 85.0 ± 0.3 | 75.5 ± 0.2 |

| | | | TerraIncognita | | | | |
|---|---|---|---|---|---|---|---|
| Dataset Model | Backbone | # of Params | location_38 | location_43 | location_46 | location_100 | Average |
| ERM | ResNet-50 | 23.5M | 56.3 ± 1.1 | 36.8 ± 4.6 | 52.6 ± 0.4 | 35.2 ± 1.7 | 45.2 ± 1.2 |
| ERM-ViT | DeiT-Small | 22M | 50.2 ± 1.4 | 30.6 ± 0.9 | 53.2 ± 0.2 | 39.6 ± 1.0 | 43.4 ± 0.5 |
| ERM-SDViT | DeiT-Small | 22M | 55.9 ± 1.7 | 31.7 ± 2.6 | 52.2 ± 0.3 | 37.4 ± 0.6 | 44.3 ± 1.0 |
| ERM-SDViT + T3A | DeiT-Small | 22M | 53.8 ± 1.2 | 36.2 ± 1.0 | 51.1 ± 1.0 | 38.5 ± 1.3 | 44.9 ± 0.4 |
| ERM-ViT | CvT-21 | 32M | 51.4 ± 1.8 | 40.1 ± 1.7 | 57.6 ± 1.0 | 45.7 ± 0.6 | 48.7 ± 0.4 |
| ERM-SDVit | CvT-21 | 32M | 53.6 ± 3.3 | 42.7 ± 1.6 | 58.2 ± 1.0 | 44.5 ± 1.8 | 49.7 ± 1.4 |
| ERM-ViT + T3A | CvT-21 | 32M | 58.1 ± 0.7 | 46.2 ± 0.3 | 57.0 ± 1.0 | 44.1 ± 2.2 | 51.4 ± 0.7 |
| ERM-ViT | T2T-ViT-14 | 21.5M | 52.5 ± 1.7 | 43.0 ± 1.3 | 53.7 ± 1.1 | 43.0 ± 1.6 | 48.1 ± 0.2 |
| ERM-SDVit | T2T-ViT-14 | 21.5M | 57.2 ± 2.9 | 45.4 ± 2.4 | 57.7 ± 0.8 | 41.9 ± 0.4 | 50.6 ± 0.8 |
| ERM-SDViT + T3A | T2T-ViT-14 | 21.5M | 59.3 ± 1.2 | 48.2 ± 1.0 | 53.1 ± 0.9 | 41.5 ± 0.2 | 50.5 ± 0.6 |

See Touvron et al.; Wu et al.; Yuan et al.; and Iwasawa et al.

TABLE 7

Comparison of target domain-wise classification accuracy on DomainNet dataset. Results are reported of the present method with the baseline using three different ViT backbones, including DeiT-Small, CvT-21, and T2T-ViT-14, and a DG baseline (T3A).

| Dataset Model | Backbone | # of Params | DomainNet Clipart | Infograph | Painting | Quickdraw | Real | Sketch | Average |
|---|---|---|---|---|---|---|---|---|---|
| ERM | ResNet-50 | 23.5M | 57.6 ± 0.6 | 18.5 ± 0.3 | 45.9 ± 0.7 | 11.6 ± 0.1 | 59.5 ± 0.3 | 48.6 ± 0.3 | 40.3 ± 0.1 |
| ERM-ViT | DeiT-Small | 22M | 62.9 ± 0.2 | 23.3 ± 0.1 | 53.1 ± 0.2 | 15.7 ± 0.1 | 65.7 ± 0.1 | 52.4 ± 0.2 | 45.5 ± 0.0 |
| ERM-SDViT | DeiT-Small | 22M | 63.4 ± 0.1 | 22.9 ± 0.0 | 53.7 ± 0.1 | 15.5 ± 0.4 | 67.4 ± 0.1 | 52.6 ± 0.2 | 45.8 ± 0.0 |
| ERM-SDVit + T3A | DeiT-Small | 22M | 64.3 ± 0.2 | 23.7 ± 0.0 | 54.2 ± 0.3 | 19.7 ± 0.4 | 69.6 ± 0.1 | 53.2 ± 0.2 | 47.4 ± 0.1 |
| ERM-ViT | CvT-21 | 32M | 69.0 ± 0.2 | 27.2 ± 0.2 | 58.4 ± 0.2 | 17.1 ± 0.3 | 71.6 ± 0.1 | 59.2 ± 0.3 | 50.4 ± 0.1 |
| ERM-SDViT | CvT-21 | 32M | 68.9 ± 0.1 | 26.7 ± 0.3 | 58.0 ± 0.1 | 17.3 ± 0.1 | 71.9 ± 0.0 | 59.5 ± 0.3 | 50.4 ± 0.0 |
| ERM-SDVit + T3A | CvT-21 | 32M | 69.7 ± 0.1 | 27.6 ± 0.2 | 58.7 ± 0.1 | 23.0 ± 0.1 | 73.6 ± 0.2 | 59.6 ± 0.1 | 52.0 ± 0.0 |
| ERM-ViT | T2T-ViT-14 | 21.5M | 67.0 ± 0.3 | 25.2 ± 0.2 | 55.3 ± 0.3 | 15.3 ± 0.2 | 70.3 ± 0.1 | 55.9 ± 0.2 | 48.1 ± 0.1 |
| ERM-SDViT | T2T-ViT-14 | 21.5M | 67.6 ± 0.2 | 25.0 ± 0.2 | 55.8 ± 0.4 | 15.2 ± 0.3 | 70.0 ± 0.1 | 55.9 ± 0.1 | 48.2 ± 0.2 |
| ERM-SDVit + T3A | T2T-ViT-14 | 21.5M | 68.2 ± 0.1 | 25.8 ± 0.2 | 56.7 ± 0.3 | 20.7 ± 0.2 | 72.4 ± 0.1 | 57.0 ± 0.2 | 50.2 ± 0.1 |

See Touvron et al.; Wu et al.; Yuan et al.; and Iwasawa et al.

Training overhead on target domains of other DG datasets: Table 8 and 9 reports training overhead, computed as relative % increase in training time (hrs.) on TerraIncognita and DomainNet datasets. The numbers report the training time increase introduced by the present method on top of the baseline. The results shows that in both large-scale DG benchmark datasets i.e. TerraIncognita (24K images) and DomainNet (500K images), the present model (ERM-SDViT) is not exceeding more than 20% relative overhead training time. Note that this training time could differ with GPU utilization.

TABLE 8

Training overhead, computed as relative % increase in training time (hrs.), introduced by the present method on top of the baseline.

| Dataset: | TerraIncognita | | | |
|---|---|---|---|---|
| Model | Location_38 | Location_43 | Location_46 | Location_100 |
| ERM-ViT | 0.268 | 0.268 | 0.270 | 0.268 |
| ERM-SDViT | 0.276 | 0.282 | 0.282 | 0.302 |
| Rel.overhead | 2.975 | 5.068 | 4.447 | 12.620 |

TABLE 9

Training overhead, computed as relative % increase in training time (hrs.), introduced by the present method on top of the baseline.

| Dataset: Model | DomainNet Clipart | Infograph | Painting | Quickdraw | Real | Sketch |
|---|---|---|---|---|---|---|
| ERM-ViT | 0.418 | 0.423 | 0.422 | 0.430 | 0.436 | 0.430 |
| ERM-SDViT | 0.482 | 0.444 | 0.510 | 0.469 | 0.446 | 0.460 |
| Rel.overhead | 15.376 | 5.124 | 20.928 | 9.079 | 2.463 | 7.089 |

In several embodiments, results are for a DeiT-Small (22M params.) backbone implemented on Nvidia RTX A6000 GPU.

Figure 19:
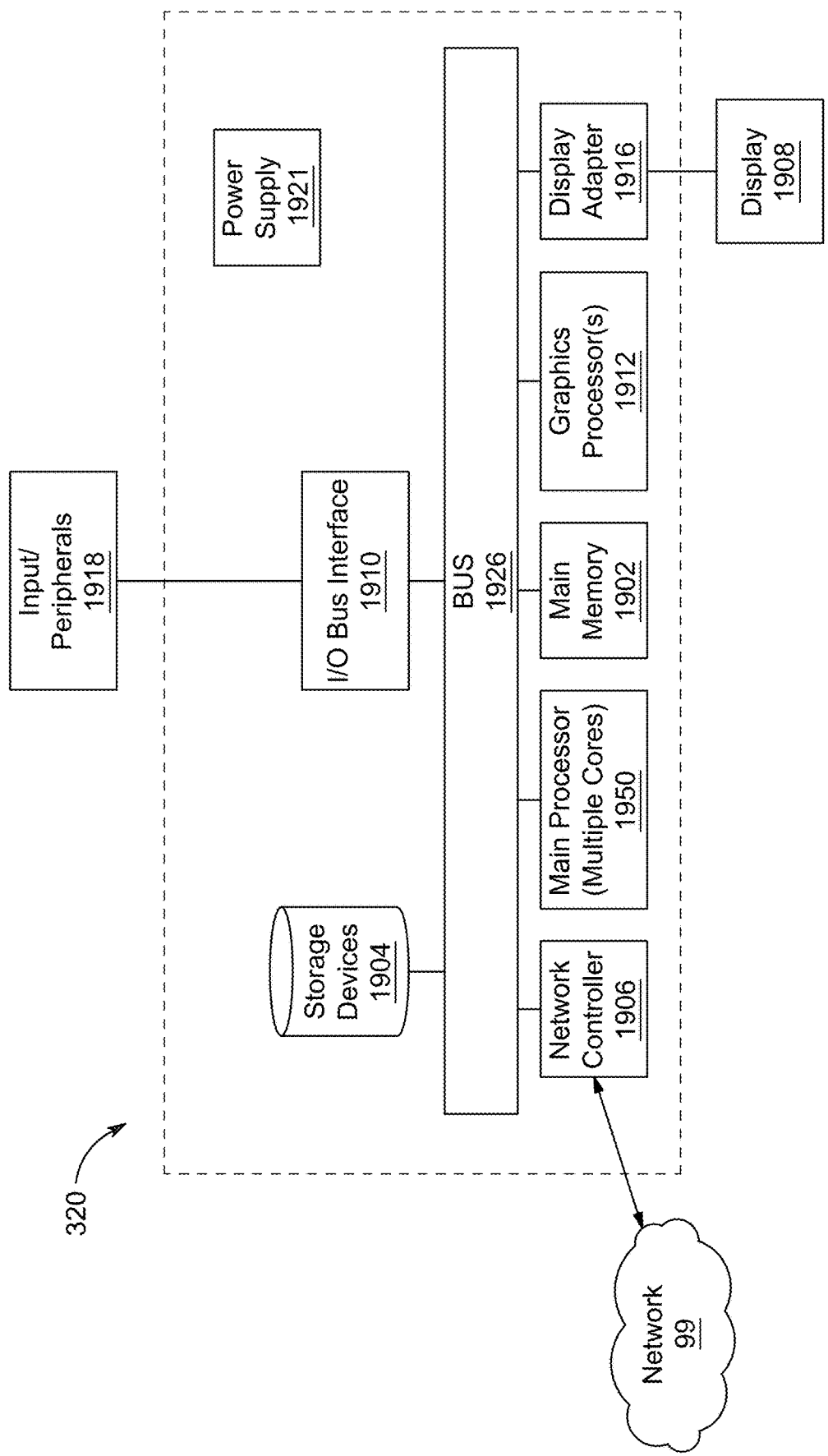
FIG. 19 is a diagram of a computer system for performing the main learning algorithms.

FIG. 19 is a block diagram illustrating an example computer system for implementing the machine learning training and inference methods according to an exemplary aspect of the disclosure. The computer system may be an AI workstation configured with an operating system, such as Ubuntu Linux OS, Windows, a version of Unix OS, or Mac OS. The computer system 1900 may include one or more central processing units (CPU) 1950 having multiple cores. The computer system 1900 may include a graphics board 1912 having multiple GPUs, each GPU having GPU memory. The graphics board 1912 may perform many of the mathematical operations of the disclosed machine learning methods. The computer system 1900 includes main memory 1902, typically random access memory RAM, which contains the software being executed by the processing cores 1950 and GPUs 1912, as well as a non-volatile storage device 1904 for storing data and the software programs. Several interfaces for interacting with the computer system 1900 may be provided, including an I/O Bus Interface 1910, Input/Peripherals 1918 such as a keyboard, touch pad, mouse, Display Adapter 1916 and one or more Displays 1908, and a Network Controller 1906 to enable wired or wireless communication through a network 99. The interfaces, memory and processors may communicate over the system bus 1926. The computer system 1900 includes a power supply 1921, which may be a redundant power supply.

In some embodiments, the computer system 1900 may include a multi-core CPU and a graphics card by NVIDIA, in which the GPUs have multiple CUDA cores. In some embodiments, the computer system 1900 may include a machine learning engine 1912, such as M2 or M3, and later, processing chips by Apple, or DRIVE Orin SoC by NVIDIA.

As mentioned above, to be useful in real-world settings, a machine learning model for medical diagnosis needs to make accurate predictions in order to avoid costly consequences. The present ERM-SDViT can be applied to medical diagnosis, including mammographic mass classification, diabetic retinopathy classification, nodule classification, skin lesion classification, Pneumonia Classification, Diabetic Foot Ulcer condition classification, Breast Cancer Classification, to name a few. Medical diagnosis can be performed using images obtained from non-limiting medical devices such as CT, MRI, and Ultrasound, In one embodiment, the T2T backbone and the present ERM-SDViT are trained for medical diagnosis based on images obtained from Computed Tomography (CT) scans. The ERM-SDViT with T2T backbone is trained with images for different lighting conditions grouped as four domains d∈{Low, Medium, Bright, High-Quality scan}. A High-Quality scan is an image taken with best settings for the given CT device. Low, Medium and Bright values are determined based on an overall brightness of an image.

In one embodiment, the T2T backbone and the present ERM-SDViT are trained for medical diagnosis based on images obtained from CT scans obtained from different CT scanning devices. The ERM-SDViT with T2T backbone is trained with images for the different CT scanning devices grouped as four domains d∈{Scanner 1, Scanner 2, Scanner 3, High-Quality scanner}. A High-Quality scanner provides an image with best settings for a given CT device.

In one embodiment, the T2T backbone and the present ERM-SDViT are trained for medical diagnosis based on images obtained from magnetic resonance imaging (MRI). The ERM-SDViT with T2T backbone is trained with images from MRI devices at different clinical locations grouped as four domains d∈{Clinic 1, Clinic 2, Clinic 3, Clinic 4}. The trained ERM-SDViT with T2T backbone is deployed to the medical clinics for medical diagnosis.

Numerous modifications and variations of the present invention are possible in light of the above teachings. It is therefore to be understood that within the scope of the appended claims. the invention may be practiced otherwise than as specifically described herein.

The invention claimed is:

1. A method of processing in a vision transformer neural network for classification of a target medical image, the vision transformer neural network having a sequence of feature extraction transformer blocks and a classifier component, the method comprising:
   a training cycle of
   providing a training dataset of medical images obtained from at least two domains for a medical diagnosis;
   receiving, in processing circuitry, a plurality of image patches and initial class tokens obtained from a medical image of the training dataset;
   processing, by the processing circuitry, the image patches and the initial class tokens through the sequence of feature extraction transformer blocks to obtain a predicted class token;
   extracting, by the processing circuitry, in parallel with the processing through the transformer blocks, intermediate class tokens as outputs of each of the feature extraction transformer blocks, where each transformer block is a sub-model;
   randomly sampling, by the processing circuitry, one sub-model from the sub-models to obtain a sampled intermediate class token;
   making a sub-model prediction, by the processing circuitry, by passing the sampled intermediate class token through the classifier component; and
   determining, by the processing circuitry, a difference between the predicted class token and the sub-model prediction and optimizing the vision transformer neural network based on the difference; and
   inferencing by
   receiving, in the processing circuitry, a plurality of target image patches for the target medical image in a target domain that is different from the at least two domains; and
   predicting, by the processing circuit, a class of the target medical image using the optimized vision transformer neural network.

2. The method of claim 1, further comprising:
   determining, using the processing circuitry, a prediction error from the predicted class token using a cross-entropy loss.

3. The method of claim 2, further comprising:
   the step of determining the difference includes determining the difference between the predicted class token and the randomly sampled intermediate class token to determine a Kullback-Leibler divergence (KL) loss; and
   minimizing an overall loss based on the cross-entropy loss and the KL loss.

4. The method of claim 1, wherein the at least two domains are multiple source domains.

5. The method of claim 4, wherein the source domains are different CT devices.

6. The method of claim 1, further comprising:
   a token-to-token module which reduces progressively a length of each of the plurality of image patches to obtain final reduced image patches,
   wherein a first of the transformer blocks receives the final reduced image patches.

7. The method of claim 1, wherein the receiving the plurality of image patches and the initial class tokens includes receiving a distillation token, and
   wherein the image patches, initial class tokens and distillation token are processed by the sequence of feature extraction transformer blocks to obtain the predicted class token and a predicted distillation token.

8. The method of claim 1, wherein dimensions of the intermediate class tokens of each of the feature extraction transformer blocks are the same.

9. An apparatus for classification of medical images obtained from a plurality of medical imaging source devices for diagnosis of a predetermined medical condition, the apparatus comprising:
   an input for receiving one at a time a training medical image of the medical images;
   processing circuitry configured to train a vision transformer neural network by
   splitting the medical image into a plurality of image patches and receiving initial class tokens,
   processing the image patches and the initial class tokens through a sequence of feature extraction transformer blocks to obtain a predicted class token,
   extracting, in parallel with the processing through the transformer blocks, intermediate class tokens as outputs of each of the feature extraction transformer blocks, where each transformer block is a sub-model,
   randomly sampling one sub-model from the sub-models to obtain a sampled intermediate class token,
   making a sub-model prediction by passing the sampled intermediate class token through a classifier component, and
   determining a difference between the predicted class token and the sub-model prediction and optimizing the vision transformer neural network based on the difference; and
   the processing circuitry configured for inferencing by
   receiving a plurality of target image patches for a target medical image received from a medical imaging source device that is different from the source devices for the training medical images; and
   predicting a class of the target medical image using the optimized vision transformer neural network.

10. The apparatus of claim 9, wherein the plurality of medical imaging source devices are different CT devices.

11. The apparatus of claim 9, wherein the plurality of medical imaging source devices are different MRI devices.

12. The apparatus of claim 9, the processing circuitry further comprising:
   a token-to-token module which reduces progressively a length of each of the plurality of image patches to obtain final reduced image patches, wherein a first of the transformer blocks receives the final reduced image patches.

13. The apparatus of claim 9, wherein the splitting into the plurality of image patches and receiving the initial class tokens includes receiving a distillation token, and
wherein the processing circuitry processes the image patches, initial class tokens and distillation token by the sequence of feature extraction transformer blocks to obtain the predicted class token and a predicted distillation token.

14. The apparatus of claim 9, wherein dimensions of the intermediate class tokens output by each of the feature extraction transformer blocks are the same.

15. A non-transitory computer readable storage medium storing program instructions, which when processed by a machine learning engine perform a method comprising:
a training cycle for a vision transformer neural network of
providing a training dataset of medical images including at least two domains for a medical diagnosis;
receiving a plurality of image patches and initial class tokens obtained from a medical image of the training dataset;
processing the image patches and the initial class tokens through a sequence of feature extraction transformer blocks to obtain a predicted class token;
extracting, in parallel with the processing through the transformer blocks, intermediate class tokens as outputs of each of the feature extraction transformer blocks, where each transformer block is a sub-model;
randomly sampling one sub-model from the sub-models to obtain a sampled intermediate class token;
making a sub-model prediction by passing the sampled intermediate class token through a classifier component; and
determining a difference between the predicted class token and the sub-model prediction and optimizing the vision transformer neural network based on the difference; and inferencing by
receiving a plurality of target image patches for a target medical image in a target domain that is different from the at least two domains; and
predicting a class of the target medical image using the optimized vision transformer neural network.

16. The computer readable storage medium of claim 15, the method further comprising:
determining a prediction error from the predicted class token using a cross-entropy loss;
the step of determining the difference includes determining the difference between the predicted class token and the randomly sampled intermediate class token to determine a Kullback-Leibler divergence (KL) loss; and
minimizing an overall loss based on the cross-entropy loss and the KL loss.

17. The computer readable storage medium of claim 15, further comprising:
a token-to-token module which reduces progressively a length of each of the plurality of image patches to obtain final reduced image patches,
wherein a first of the transformer blocks receives the final reduced image patches.

18. The computer readable storage medium of claim 15, wherein the receiving the plurality of image patches and the initial class tokens includes receiving a distillation token, and
wherein the image patches, initial class tokens and distillation token are processed by the sequence of feature extraction transformer blocks to obtain the predicted class token and a predicted distillation token.

19. The computer readable storage medium of claim 15, wherein dimensions of the intermediate class tokens of each of the feature extraction transformer blocks are the same.

20. The computer readable storage medium of claim 15, wherein at least two domains for the medical image and the target domain are different medical imaging source devices of a same type of medical device.

* * * * *